US011224834B2

(12) United States Patent
Boulet et al.

(10) Patent No.: US 11,224,834 B2
(45) Date of Patent: Jan. 18, 2022

(54) COMBUSTION SYSTEM INCORPORATING TEMPERATURE SWING ADSORPTIVE GAS SEPARATION

(71) Applicant: INVENTYS THERMAL TECHNOLOGIES INC., Burnaby (CA)

(72) Inventors: Andre Boulet, Bowen Island (CA); Soheil Khiavi, North Vancouver (CA)

(73) Assignee: Svante Inc., Burnaby (CA)

( * ) Notice: Subject to any disclaimer, the term of this patent is extended or adjusted under 35 U.S.C. 154(b) by 246 days.

(21) Appl. No.: 16/089,700

(22) PCT Filed: Mar. 30, 2017

(86) PCT No.: PCT/CA2017/050388
§ 371 (c)(1),
(2) Date: Sep. 28, 2018

(87) PCT Pub. No.: WO2017/165972
PCT Pub. Date: Oct. 5, 2017

(65) Prior Publication Data
US 2019/0107009 A1 Apr. 11, 2019

Related U.S. Application Data

(60) Provisional application No. 62/316,410, filed on Mar. 31, 2016.

(51) Int. Cl.
*B01D 53/04* (2006.01)
*F23J 15/02* (2006.01)
(Continued)

(52) U.S. Cl.
CPC ......... *B01D 53/0462* (2013.01); *B01D 53/02* (2013.01); *F01K 17/06* (2013.01);
(Continued)

(58) Field of Classification Search
CPC ................ B01D 53/02; B01D 53/0462; B01D 2257/302; B01D 2257/504; B01D 53/047;
(Continued)

(56) References Cited

U.S. PATENT DOCUMENTS 4,421,732 A 12/1983 Komuro et al.
5,298,054 A * 3/1994 Malik .................... B01D 53/04
95/104

(Continued)

FOREIGN PATENT DOCUMENTS

CA          2743718 A1      6/2010
CA   WO2014/100904 A1 *   7/2014   ............. B01D 53/62
(Continued)

OTHER PUBLICATIONS

WO2015041122A1_ENG (Espacenet machine translation of Uchida) (Year: 2015).*

(Continued)

*Primary Examiner* — Jonathan Miller
*Assistant Examiner* — Gabriel E Gitman
(74) *Attorney, Agent, or Firm* — Voyer Law

(57) ABSTRACT

A combustion system and process of operating the combustion system incorporating an electrostatic precipitator, an optional flue gas desulfurizer, and a temperature swing adsorptive gas separator, for post-combustion emission abatement is provided. A very low pressure steam stream may be employed as a first regeneration stream for the temperature swing adsorptive gas separator where the very low pressure steam stream may optionally be recovered from, a very low pressure steam turbine or an auxiliary boiler. A fluid stream at a suitable temperature for regeneration of at least one adsorbent material in the temperature swing adsorptive gas separator may be employed as a second regeneration stream where the fluid stream may (Continued)

optionally be recovered from an electrostatic precipitator, an oxidant preheater, or an auxiliary heater.

7 Claims, 7 Drawing Sheets

(51) Int. Cl.
*F22B 31/08* (2006.01)
*F23L 15/04* (2006.01)
*B01D 53/02* (2006.01)
*F01K 17/06* (2006.01)

(52) U.S. Cl.
CPC ............ *F22B 31/08* (2013.01); *F23J 15/02* (2013.01); *F23L 15/04* (2013.01); *B01D 2257/302* (2013.01); *B01D 2257/504* (2013.01); *F23J 2219/60* (2013.01); *Y02E 20/34* (2013.01)

(58) Field of Classification Search
CPC ............ B01D 53/0473; B01D 53/0476; B01D 53/053; B01D 53/06; F01K 17/06; F23J 15/02; F23J 15/04; F23J 2219/60; F23L 15/04; F22B 31/08; Y02E 20/32; Y02E 20/34
See application file for complete search history.

(56) References Cited

U.S. PATENT DOCUMENTS

| | | | |
|---|---|---|---|
| 8,084,010 B2 | 12/2011 | Berg et al. | |
| 8,133,308 B2 | 3/2012 | Lively et al. | |
| 8,409,332 B2 | 4/2013 | Lively et al. | |
| 8,414,852 B1 | 4/2013 | Johnson et al. | |
| 8,951,490 B2 | 2/2015 | Okumura et al. | |
| 9,146,035 B2 | 9/2015 | Boulet | |
| 2004/0109800 A1* | 6/2004 | Pahlman | B01D 53/12 423/210 |
| 2010/0251887 A1* | 10/2010 | Jain | B01D 53/0462 95/46 |
| 2011/0139046 A1 | 6/2011 | Fan et al. | |
| 2011/0247491 A1 | 10/2011 | Leitgeb et al. | |
| 2012/0012000 A1 | 1/2012 | Wright et al. | |
| 2012/0125194 A1 | 5/2012 | Caram et al. | |
| 2012/0131897 A1* | 5/2012 | Gonzalez | F04F 5/54 60/39.5 |
| 2012/0216547 A1 | 8/2012 | Li et al. | |
| 2012/0325088 A1 | 12/2012 | Hornbostel et al. | |
| 2013/0036905 A1 | 2/2013 | Lively et al. | |
| 2014/0137780 A1* | 5/2014 | Boulet | B01D 53/0462 110/345 |
| 2014/0186255 A1* | 7/2014 | Jadhav | C01B 3/508 423/437.1 |
| 2015/0013543 A1* | 1/2015 | Yoshikawa | B01D 53/0462 96/145 |
| 2015/0135951 A1 | 5/2015 | Chen et al. | |
| 2015/0135952 A1 | 5/2015 | Chen et al. | |
| 2015/0251129 A1 | 9/2015 | Heirman et al. | |
| 2015/0258488 A1* | 9/2015 | Meirav | F24F 11/30 95/115 |
| 2015/0375161 A1 | 9/2015 | Boulet | |
| 2015/0338098 A1 | 11/2015 | Boulet | |
| 2016/0010852 A1 | 1/2016 | Slavens et al. | |
| 2016/0016108 A1* | 1/2016 | Park | B01D 53/12 95/148 |

FOREIGN PATENT DOCUMENTS

| | | | | |
|---|---|---|---|---|
| CA | WO2014100904 A1 * | 7/2014 | ......... | B01D 53/0407 |
| EP | 1688173 A2 | 8/2006 | | |
| EP | 2335804 B1 | 9/2014 | | |
| JP | WO2015/041122 A1 * | 3/2015 | ............ | F01K 13/02 |
| JP | WO2015041122 A1 * | 3/2015 | ............ | F01K 13/02 |
| WO | 2007079381 A1 | 7/2007 | | |
| WO | 2011067638 A1 | 6/2011 | | |
| WO | 2012024804 A1 | 3/2012 | | |
| WO | 2012055715 A2 | 5/2012 | | |
| WO | 2012083108 A2 | 6/2012 | | |
| WO | 2012170925 A1 | 12/2012 | | |
| WO | 2013003955 A1 | 1/2013 | | |
| WO | WO2014100904 A1 * | 3/2013 | ............ | B01D 53/62 |
| WO | 2014100904 A1 | 7/2014 | | |
| WO | 2016003484 A2 | 1/2016 | | |

OTHER PUBLICATIONS

International Search Report for PCT/CA2017/050388.
Written Opinion for PCT/CA2017/050388.

* cited by examiner

COMBUSTION SYSTEM INCORPORATING TEMPERATURE SWING ADSORPTIVE GAS SEPARATION

FIELD

The present technology relates generally to processes for temperature swing adsorptive gas separation of combustion gases produced by fossil-fuel combustors and systems therefore. More particularly, the present technology relates to a process of operating a coal-fired boiler incorporating temperature swing adsorptive gas separation of carbon dioxide and systems incorporating the same.

BACKGROUND

Temperature swing adsorption methods are known in the art for use in adsorptive separation of multi-component gas mixtures. Many conventional temperature swing adsorption processes are used for preferentially adsorbing one component of a feed gas mixture on an adsorbent material, separating the adsorbed component from the remaining feed gas components, and subsequently regenerating the adsorbent material by desorbing the adsorbed component which may allow for cyclic reuse of the adsorbent material. In some methods, a water stream in the form of steam, may be employed as a regeneration stream to regenerate the adsorbent material. However, in other methods according to the art, alternative fluid streams at elevated temperatures, for example, a combustion gas stream, a hot inert gas stream or a hot air stream, may also be employed as a regeneration stream to regenerate an adsorbent material.

One type of industrial process where gas separation may be desirable includes combustion processes, where an oxidant and a typically carbon-containing fuel are combusted to generate, for example, heat, a combustion gas stream (also known as a combustion flue gas stream) and mechanical power, such as through expansion of combustion gases and/or a suitable working fluid. The separation of one or more gas component from the combustion gas stream may be desirable, such as for the removal and/or sequestration of carbon dioxide gas from the combustion gas stream, for example.

In a combustion process and system incorporating temperature swing adsorptive gas separation, it may be desirable to reduce the quantity of steam or quantity of steam high in exergy (or useful energy of a steam stream) consumed for regeneration of the adsorbent material as the availability of steam may be limited and/or steam may be highly valued, which may result in increasing the operating cost of a combustion based system incorporating a temperature swing adsorptive gas separation process according to some aspects of the prior art. In an attempt to reduce the consumption of steam for regeneration in some known designs, attempts to employ an alternative regeneration stream, for example, a combustion gas stream, to at least partially regenerate the adsorbent material and/or to regenerate at least a portion of the adsorbent material, may be made. However, in some such applications, the combustion gas stream may contain undesirably high levels of contaminants, for example, particulates, which may undesirably reduce the performance of the adsorbent material if used for regeneration. Furthermore, in some applications employing some post-combustion emission abatement processes and devices, such as for example, a flue gas desulfurizer, the availability of a combustion gas stream at a temperature desired for regeneration of the adsorbent material, may be limited or non-existent.

SUMMARY

In various embodiments according to the present disclosure, a combustion system incorporating a temperature swing adsorptive gas separator may comprise:

an oxidant preheater fluidly connected to a primary oxidant source via a primary oxidant fan to recover a primary oxidant stream, a secondary oxidant source via a secondary oxidant fan to recover a secondary oxidant stream, for forming a preheated primary oxidant stream and a preheated secondary oxidant stream;

a fuel source comprising a fuel stream;

a combustor fluidly connected to recover at least one of the preheated primary oxidant stream and the preheated secondary oxidant stream from the oxidant preheater, to combust with the fuel stream from the fuel source, for producing a combustion gas stream and fluidly connected to admit the combustion gas stream into the oxidant preheater;

a feedwater source;

an integrated heat exchanger having a hot side fluidly connected to the combustor and the oxidant preheater, and a cold side fluidly connected to recover at least one of a water and/or condensate stream from the feedwater source, for converting the water stream and/or condensate stream in the cold side into a high pressure steam stream;

a particulate collector fluidly connected to recover the combustion gas stream from the hot side of the integrated heat exchanger, for forming a first treated combustion gas stream;

a direct contact cooler fluidly connected to recover a portion of the first treated combustion gas stream from the particulate collector, and a temperature swing adsorptive gas separator fluidly connected to recover the first treated combustion gas stream from the direct contact cooler as the feed stream, to recover a portion of the first treated combustion gas stream from the particulate collector as a regeneration stream, for separating at least a first component from said feed stream.

In further embodiments according to the disclosure, a combustion system incorporating a temperature swing adsorptive gas separator may comprise:

an oxidant preheater fluidly connected to a primary oxidant source via a primary oxidant fan to recover a primary oxidant stream, a secondary oxidant source via a secondary oxidant fan to recover a secondary oxidant stream, for forming a preheated primary oxidant stream and a preheated secondary oxidant stream;

a fuel source;

a combustor for producing a combustion gas stream, fluidly connected to recover the preheated primary oxidant stream and the preheated secondary oxidant stream from the oxidant preheater, to recover a fuel stream from the fuel source, and to admit the combustion gas stream into the oxidant preheater;

a feedwater source;

an integrated heat exchanger having a hot side fluidly connected to the combustor and the oxidant preheater, and a cold side fluidly connected to recover at least one of a water and/or condensate stream from the feedwater source, for converting the water and/or condensate stream in the cold side into a high pressure steam stream;

at least one of a particulate collector fluidly connected to recover the combustion gas stream from the oxidant preheater for forming a first treated combustion gas stream, and a flue gas desulfurizer fluidly connected to recover the first treated combustion gas stream from the particulate collector or the combustion gas stream from the oxidant preheater, for forming a second treated combustion gas stream;

a direct contact cooler fluidly connected to recover at least a portion of the second treated combustion gas stream from at least one of the particulate collector and flue gas desulfurizer, and a temperature swing adsorptive gas separator fluidly connected to recover the second treated combustion gas stream from the direct contact cooler as a feed stream, for separating at least a first component from the feed stream.

In various embodiments, a process of operating a combustion system comprising a particulate collector and a temperature swing adsorptive gas separator is provided. In one such embodiment, the process comprises the steps of:

admitting a fuel stream into a combustor, admitting an oxidant stream into the combustor, and combusting the fuel stream with the oxidant stream to produce a combustion gas stream;

admitting the combustion gas stream into a particulate collector forming a first treated combustion gas stream having reduced levels of particulates relative to the combustion gas stream;

admitting at least a portion of the first treated combustion gas stream into a direct contact cooler reducing a temperature of the first treated combustion gas stream, forming a feed stream;

admitting the feed stream into the temperature swing adsorptive gas separator to adsorb at least a first component of the feed stream on at least one adsorbent material in the temperature swing adsorptive gas separator and recovering a first product stream from the temperature swing adsorptive gas separator;

admitting a low pressure steam stream into the temperature swing adsorptive gas separator to desorb a first portion of the first component adsorbed on the at least one adsorbent material in the temperature swing adsorptive gas separator and recovering a second product stream from the temperature swing adsorptive gas separator, and admitting at least a portion of the first treated combustion gas stream into the temperature swing adsorptive gas separator to desorb a second portion of the first component adsorbed on the adsorbent material in the temperature swing adsorptive gas separator and recovering a third product stream from the temperature swing adsorptive gas separator.

In various embodiments, a process of operating a combustion system comprising a particulate collector, a flue gas desulfurizer and a temperature swing adsorptive gas separator is provided. In one such embodiment, the process comprises the steps of:

admitting an primary oxidant stream into an oxidant preheater forming a preheated primary oxidant stream, admitting a secondary oxidant stream into the oxidant preheater forming a preheated secondary oxidant stream, admitting a fuel stream to combine with the preheated primary oxidant source forming a combined fuel stream;

admitting the preheated secondary oxidant stream and the combined fuel stream into a boiler, combusting the preheated secondary oxidant stream and the combined fuel stream, producing a combustion gas stream;

admitting the combustion gas stream into the oxidant preheater, admitting the combustion gas stream into a particulate collector, forming a first treated combustion gas stream;

admitting the first treated combustion gas stream into an electrostatic precipitator, forming a second treated combustion gas stream;

admitting at least a portion of the second treated combustion gas stream into a direct contact cooler, forming a feed stream;

admitting the feed stream into the temperature swing adsorptive gas separator to adsorb at least a first component of the feed stream on at least one adsorbent material in the temperature swing adsorptive gas separator and recovering a first product stream from the temperature swing adsorptive gas separator, and admitting a low pressure steam stream into the temperature swing adsorptive gas separator to desorb a first portion of the first component adsorbed on the at least one adsorbent material in the temperature swing adsorptive gas separator and recovering a second product stream from the temperature swing adsorptive gas separator.

In various embodiments, a process of operating a combustion system comprising a combustor, a steam turbine, and a temperature swing adsorptive gas separator is provided. In one such embodiment, the process comprises the steps of:

admitting a fuel stream into a combustor, admitting an oxidant stream into the combustor, and combusting the fuel stream with the oxidant stream, producing a combustion gas stream;

admitting at least one of a water stream and/or a condensate stream into a heat exchange device;

directing the combustion gas stream to contact the heat exchange device, for converting the water stream and/or the condensate stream in the heat exchange device into a high pressure steam stream, and admitting the high pressure steam stream into a steam turbine having at least one of an intermediate pressure turbine and a low pressure turbine.

BRIEF DESCRIPTION OF THE DRAWINGS

Like reference numerals refer to corresponding parts throughout the several views of the drawings.

DETAILED DESCRIPTION

Figure 1:
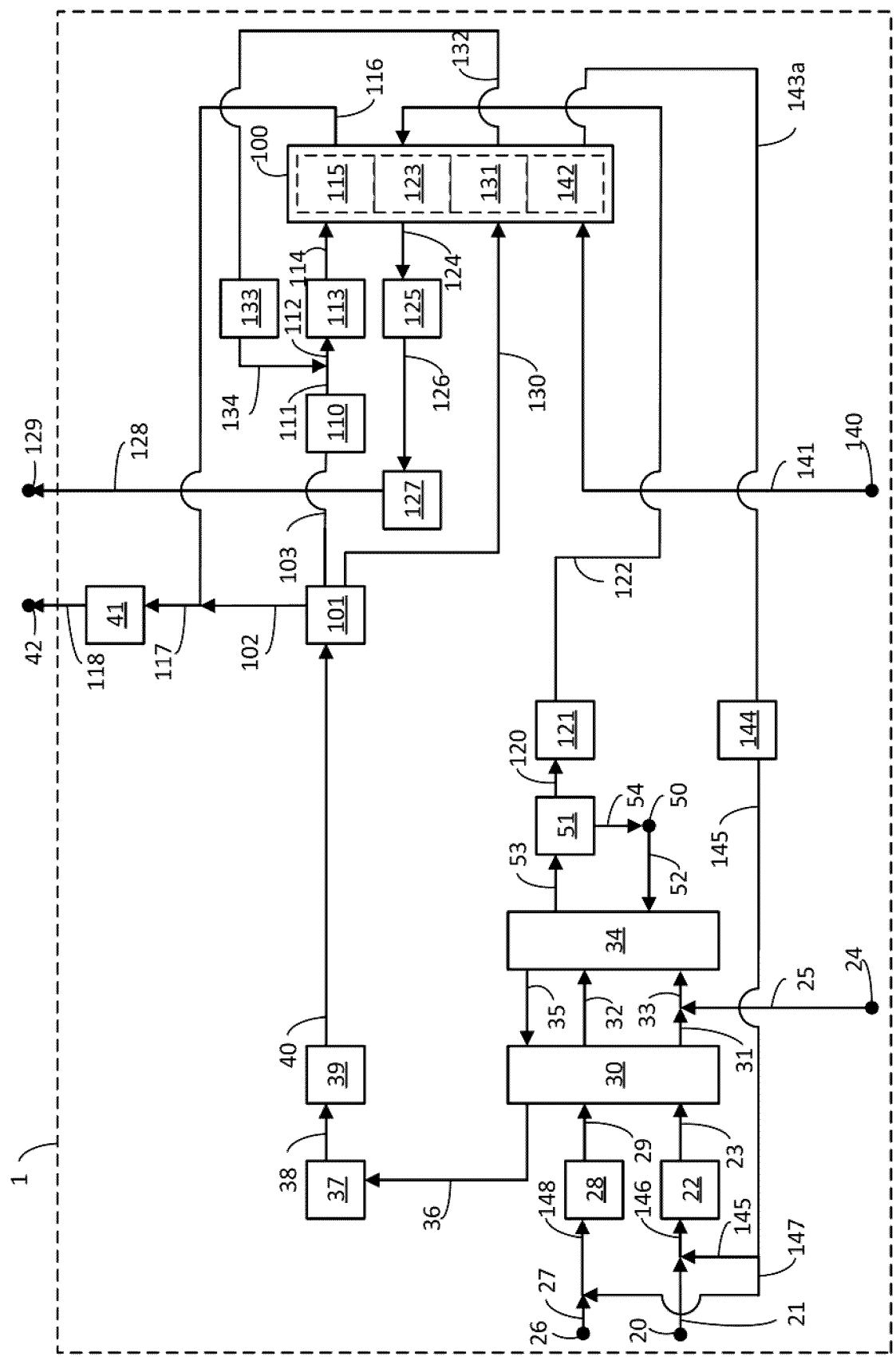
FIG. 1 is a simplified schematic diagram illustrating a combustion system according to an embodiment of the present disclosure, comprising an electrostatic precipitator, a temperature swing adsorptive gas separator, and a low pressure steam turbine. A low pressure steam stream may be recovered from the low pressure steam turbine and admitted as a first regeneration stream into the temperature swing adsorptive gas separator. A portion of a first treated combustion gas stream recovered from the electrostatic precipitator may be admitted as a feed stream and a second regeneration stream into the temperature swing adsorptive gas separator.

Some conventional combustion systems may employ post-combustion emission abatement devices for reducing the quantity or level of particulates from a combustion gas stream, such as for example, an electrostatic precipitator (herein referred as "ESP"), a mechanical collector or cyclone, a fabric filters or baghouses, a wet scrubber, or a particulate filter such a diesel particulate filter, or combinations thereof. Some conventional systems may also employ post-combustion emission abatement devices for reducing the quantity or level of sulfur oxides (herein referred as "$SO_x$") from the combustion gas stream, such as for example, a flue gas desulfurizer (herein referred as "FGD"). In some conventional combustion system applications, a combustion gas stream produced from a combustor, for example, a coal-fired boiler, may comprise a suitable amount of heat energy desired or a suitable temperature desired for employment as a regeneration stream for regeneration of an adsorbent material in a temperature swing adsorptive gas separator and temperature swing adsorptive gas separation process. However, a combustion gas stream (such as from upstream to and prior to processing or treatment by an ESP) may also comprise high levels of particulates, which may result in the combustion gas stream being undesirable for employment as a feed stream for a TSA separator and/or a regeneration stream for regeneration of the adsorbent material in the TSA separator. Furthermore, in conventional combustion systems employing a FGD, a first treated combustion gas stream downstream to and processed by the FGD having reduced levels of particulates, may comprise an insufficient amount of heat energy or be at a temperature less than desired for regeneration, resulting in the first treated combustion gas stream of the FGD to be undesirable for employment as a regeneration stream for regeneration of the adsorbent material.

In one aspect of the present disclosure, a process is provided for operating a combustion system comprising a fuel combustor (herein referred as "combustor") including, for example, a coal-fired combustor (including solid, pulverized, gasified or other forms of coal-fueled combustors such as coal-fired power generation plants), a biomass solid and/or liquid fuel combustor, a steam generator/boiler combustor, a process heater combustor (such as may be used in refinery and/or industrial processes to heat process fluids and/or gases), or a diesel engine or other suitable internal combustion engine. In one such aspect, the combustion system may also comprise an optional particulate collector, and a temperature swing adsorptive gas separator (herein referred as "TSA separator").

In an embodiment according to the present disclosure, a temperature swing adsorptive gas separation process (herein referred to as a "TSA process") and a TSA separator may be employed to separate at least one fluid component, for example, a first component, from a multi-component fluid mixture comprising at least the first fluid component and a second fluid component. In one aspect, the TSA process may employ at least one adsorbing step and one or more regeneration steps such as for example, a first regenerating step for desorbing at least a first portion of at least one component, for example, a first component, adsorbed on the at least one adsorbent material (herein referred as "adsorbent material") in a TSA separator, and optionally a second regenerating step, for desorbing at least a second portion of at least one component, for example, the first component, adsorbed on the adsorbent material in the TSA separator and/or desorbing other components, for example, a third component. In one aspect the TSA process may also comprise an optional conditioning step, to desorb or sweep other fluid components from the adsorbent contactor and/or adsorbent zone of a TSA separator, and/or to change the temperature of the adsorbent material in the contactor and/or zone of a TSA separator prior to beginning the adsorbing step. In one embodiment, at least one regenerating step, for example a first regenerating step, may be driven primarily by heating of the adsorbent material within a TSA separator or by a swing in temperature of the adsorbent material, and/or a partial pressure swing, for example (a difference in partial pressure or concentration of at least one component of the first regeneration stream and at least one component adsorbed on the at least one adsorbent material), and/or a swing in heat of adsorption energy, for example, a difference in heat of adsorption energy of at least one component of the first regeneration stream and at least one component adsorbed on the at least one adsorbent material. In another embodiment, one or more secondary desorptive mechanisms, for example, temperature swing, partial pressure swing, vacuum, purge, or displacement purge, such as with a purge fluid, may also be used in desorption of one or more adsorbed components. In one such embodiment, additional regenerating steps for desorption of a component adsorbed on an adsorbent material may be driven primarily by one or more of: a swing in temperature of the adsorbent material within a TSA separator, a swing in partial pressure or concentration of a component within a TSA separator, a swing in pressure of a TSA separator, a swing in heat of adsorption energy, or displacement purge. In one aspect, an optional conditioning step may be primarily driven by displacement purge. Accordingly, it is understood that while aspects of the present disclosure are disclosed with reference to an exemplary TSA process and exemplary TSA separator, that in certain embodiments, particularly where at least one process step, such as a regeneration or conditioning step, may be conducted at a reduced pressure such as a sub-ambient or partial vacuum pressure, that the adsorption and particularly desorption of one of more components to and/or from one or more adsorbent materials comprised in a contactor may be driven by a one or more adsorptive driving forces such as but not limited to: a thermal swing in one or more of a temperature of an adsorbent material or heat of adsorption of one or more fluid components adsorbed/desorbed on/from an adsorbent material, a swing in partial pressure or concentration of a component within a TSA separator, a swing in pressure of a TSA separator, a swing in heat of adsorption energy, or displacement purge, or combinations thereof. Accordingly, for the purposes of any of the embodiments or aspects described in the present disclosure, it may be understood that the adsorptive processes and systems, such as the exemplary TSA processes and separator embodiments, referenced in the present disclosure may comprise any one or more or combination of such adsorptive driving forces without limitation, as may be suitable for providing adsorption and/or desorption of fluid components according to various contemplated applications of the presently disclosed processes and systems.

In one aspect according to the present disclosure, an exemplary TSA process and exemplary TSA separator are provided, for separating at least a first component, such as for example, one or more of carbon dioxide (herein referred as "$CO_2$"), sulfur oxides, nitrogen, oxygen, and/or heavy metals, from a multi-component fluid mixture. In one such aspect, a multi-component fluid mixture may comprise, for example, a combustion gas stream or a flue gas stream produced by a combustor. In one aspect, the multi-component fluid mixture may be employed as a feed stream for the exemplary TSA process and exemplary TSA separator and may comprise at least the first component and a second component, such as for example, nitrogen (herein referred as "$N_2$"). In one embodiment, the TSA process comprises an adsorbing step, a first regenerating step, an optional second regenerating step and an optional conditioning step, while the TSA separator comprises a single rotating contactor having at least one adsorbent material, which cycles or rotates around a central axis through four zones, for example, a first zone, a second zone, a third zone, and a fourth zone, housed in at least one enclosure. During the exemplary TSA process, a first step or adsorbing step of the TSA process may occur in a first zone of the TSA separator, a second step or first regenerating step of the TSA process may occur in a second zone of the TSA separator, an optional third step or optional second regenerating step of the TSA process may occur in a third zone of the TSA separator, and an optional fourth step or optional conditioning step of the TSA process may occur in a fourth zone of the TSA separator. Alternatively, additional steps of a TSA process and additional zones of a TSA separator may be employed, for example, a pre-regenerating step (subsequent to an adsorbing step and prior to a first regenerating step) which may occur in a pre-regeneration zone (which may be adjacent to a first regeneration zone and/or prior in sequence to a first regeneration zone), and a reflux step (prior to or subsequent to an adsorbing step) which may occur in a reflux zone (which may be adjacent to a side of an adsorption zone) of the contactor. In embodiments of the present disclosure, a TSA separator may employ any suitable adsorbent materials for implementing the desired adsorption of at least one fluid component from a feed stream, including but not limited to, for example, desiccant, activated carbon, graphite, carbon molecular sieve, activated alumina, molecular sieve, aluminophosphate, silicoaluminophosphate, zeolite adsorbent, ion exchanged zeolite, hydrophilic zeolite, hydrophobic zeolite, modified zeolite, natural zeolites, faujasite, clinoptilolite, mordenite, metal-exchanged silico-aluminophosphate, uni-polar resin, bi-polar resin, aromatic cross-linked polystyrenic matrix, brominated aromatic matrix, methacrylic ester copolymer, carbon fiber, carbon nanotube, nano-materials, metal salt adsorbent, perchlorate, oxalate, alkaline earth metal particle, ETS, CTS, metal oxide, supported alkali carbonates, alkali-promoted hydrotalcites, chemisorbent, amine, organo-metallic reactant, and metal organic framework adsorbent materials, and combinations thereof.

In one embodiment of the present disclosure, a process of operating a combustion system comprising a temperature swing adsorptive gas separator, and an optional particulate collector such as for example, an electrostatic precipitator, is provided. In one such embodiment, the temperature swing adsorptive gas separator may separate at least a first component (such as, for example, carbon dioxide (herein referred as "$CO_2$"), sulfur oxides, nitrogen, oxygen, and/or heavy metals) from a feed stream. A primary oxidant stream employed for a combustor or boiler of the combustion system, may be recovered from one or more primary oxidant sources, admitted into a primary oxidant fan and into an oxidant preheater to increase the temperature of the primary oxidant stream to, for example, about 250-300° C., forming a preheated primary oxidant stream. A fuel source may admit a fuel stream employed for the combustor or boiler, to combine with the preheated primary oxidant stream to form a combined fuel stream which may be admitted into a combustor or boiler. A secondary oxidant stream employed for the combustor or boiler, may be recovered from one or more secondary oxidant sources, admitted into a secondary oxidant fan and into the oxidant preheater to increase the temperature of the secondary oxidant stream. In one such embodiment, the temperature of the secondary oxidant stream may be increased to, for example, about 250-300° C., forming a preheated secondary oxidant stream before admitting the preheated secondary oxidant stream into the boiler. The preheated secondary oxidant stream and combined fuel stream may be mixed and combusted, producing a combustion gas stream and heat.

In one embodiment, an integrated heat exchanger which may optionally be incorporated with the combustor or boiler comprises a hot side fluidly connected to recover the combustion gas stream from the combustor and a cold side fluidly connected to a feedwater source. The combustion gas stream may supply heat to the integrated heat exchanger converting a water and/or condensate stream recovered from the feedwater source, into a high pressure steam stream in the cold side of the integrated heat exchanger. The high pressure steam stream may be recovered from the hot side of the integrated heat exchanger and optionally admitted into a steam turbine, for example, a multistage steam turbine having a high pressure turbine or stage, an intermediate pressure turbine or stage, and a low pressure turbine or stage, to power, for example, an electric generator, or optionally employed for and admitted into an industrial process.

In one aspect of the disclosure, the combustion gas stream may be recovered from the hot side of the integrated heat exchanger and admitted into the oxidant preheater, where the combustion gas stream may supply and transfer heat to increase the temperature of the primary oxidant stream and secondary oxidant stream admitted into the oxidant preheater. The combustion gas stream may be recovered from the oxidant preheater and admitted into an optional particulate collector, for example an electrostatic precipitator or ESP, for processing where particulates in the combustion gas stream may be separated, forming a first treated combustion gas stream having a reduced quantity or level of particulates relative to a quantity or level of particulates in the combustion gas stream. In one such embodiment, the first treated combustion gas stream may have a temperature in a range of, for example, about 150-200° C. The first treated combustion gas stream may be recovered from the ESP and admitted into a fan, for example, an induced draft fan, which directs and admits the first treated combustion gas stream into an optional combustion gas valve, for example, a diverter valve, which may optionally selectively direct and admit at least a portion of the first treated combustion gas stream to a stack for dispersion and release into an ambient environment and recovery from the combustion system.

In one process embodiment, the optional combustion gas valve may also selectively direct and admit at least a portion of the first treated combustion gas stream into a booster fan which then directs and admits the first treated combustion gas stream into a heat transfer device, for example, a direct contact cooler (herein referred to as a "DCC"), to reduce the temperature of the first treated combustion gas stream. In one such embodiment, the DCC may reduce the temperature of the first treated combustion gas stream to a temperature of, for example, equal to or less than about 50° C., or specifically equal to or less than about 40° C., or more specifically equal to or less than about 30° C., before admitting the first treated combustion gas stream as a feed stream into a first zone of the TSA separator during a first step or adsorbing step of an exemplary TSA process. As the first treated combustion gas stream contacts the at least one adsorbent material in the first zone of the TSA separator at least a portion of the first component, for example, $CO_2$, of the first treated combustion gas stream may be adsorbed by the at least one adsorbent material, separating the first component from non-adsorbed components of the first treated combustion gas stream. A portion of first treated combustion gas stream and/or non-adsorbed components of first treated combustion gas stream may form a first product stream which may be depleted in the first component relative to the feed stream and be recovered from first zone of TSA separator. First product stream may be directed to optionally combine with a portion of first treated combustion gas stream at a higher temperature, forming a second treated combustion gas stream with sufficient buoyancy which may be admitted into the stack for dispersion and release into the ambient environment and recovery from the combustion system as a flue gas stream. Optionally, at least a portion of first product stream may periodically be directed to form a portion of the feed stream admitted into a first zone of the TSA separator during a first step or adsorbing step of an exemplary TSA process. Employing at least a portion of the first treated combustion gas stream as a feed stream for the TSA separator may advantageously reduce the performance degradation of the at least one adsorbent material and/or TSA separator which may occur due to particulate contamination.

In another process embodiment, a first regeneration stream comprising, for example, a third component or a water (herein referred as "$H_2O$") stream such as in the form of a low pressure steam stream, may be recovered from the steam turbine, for example, at a location between an intermediate pressure turbine and a low pressure turbine of the steam turbine, or downstream to a low pressure turbine, and admitted into a very low pressure steam turbine or VLP turbine, to power a mechanically coupled device, such as for example, an auxiliary electric generator, a water pump or a fan. In one such embodiment, a VLP turbine may power such a mechanically coupled device so as to advantageously increase the efficiency of the combustion system. In one embodiment, a very low pressure steam stream, for example, less than about 300 kPa absolute, or specifically less than about 150 kPa absolute, or more specifically less than about 20 kPa absolute, may be recovered from the VLP turbine and admitted into a second zone of the TSA separator as a first regeneration stream during a second step or first regenerating step of an exemplary TSA process, which may increase the temperature of the at least one adsorbent material, desorbing at least a portion of the first component adsorbed on the at least one adsorbent material. At least a portion of the first regeneration stream, for example, third component or $H_2O$, and/or desorbed components, for example, first component or $CO_2$, adsorbed on the at least one adsorbent material in a second zone of the TSA separator may form a second product stream, which may be recovered from a second zone of the TSA separator. The second product stream may be admitted into at least one condenser, for example, a water separator, a cooler, or a condensing heat exchanger, separating condensable components, for example, a third component or $H_2O$, from the second product stream, forming a condensate stream and a purified second product stream which may be high in purity comprising substantially the first component, while causing a reduction in pressure in the condenser and fluidly connected second zone of the TSA separator. In one embodiment, such a reduction in pressure may be assisted and/or maintained by employing at least one pump, for example, an ejector, a vacuum pump, a compressor or multistage compressor operating at sub-ambient inlet pressure, or a valve, for example, a check valve, fluidly connected downstream to the condenser. In one such embodiment, the resulting reduction in pressure in the second zone of the TSA separator may assist in desorption of at least one component adsorbed on the at least one adsorbent material. In a further embodiment, the purified second product stream may be recovered from at least one condenser and admitted into a compressor, for example, a multistage compressor with interstage cooling, to produce a compressed second product stream high in purity at elevated pressure which may be recovered from the compressor and combustion system, and directed to an end use, which in the case of adsorptive gas separation of carbon dioxide as a second product may comprise, for example, sequestration, enhanced oil recovery or an industrial process. Alternatively, a portion of a steam stream, for example, a high pressure steam stream, a low pressure steam stream, or a very low pressure steam stream, may be recovered from the boiler or steam turbine and admitted into a second zone of the TSA separator as a first regeneration stream during a second step or first regenerating step of an exemplary TSA process, and/or a plurality of first regeneration streams may be employed, for example, a low pressure steam stream and a fluid stream enriched in the first component (relative to the feed stream or first treated combustion gas stream) or comprising substantially the first component at a pressure and/or temperature suitable for regeneration. Optionally, a plurality of very low pressure steam streams may be recovered from a VLP turbine and admitted into a plurality of TSA separators.

In an alternative process embodiment, a plurality of condensers, for example, a water separator, a cooler, or a condensing heat exchanger, may be employed and fluidly connected in series, optionally having at least one valve, for example, a check valve, and/or at least one pump, for example, an ejector, a vacuum pump, a compressor or multistage compressor operating at a sub-ambient inlet pressure, fluidly connected between condensers and/or downstream to a condenser. In one such alternative embodiment, a second product stream recovered from the second zone of the TSA separator may be admitted into a first stage condenser forming a condensate stream and a purified second product stream high in purity comprising substantially the first component, while causing a reduction in pressure or pressure drop within the condenser and fluidly connected second zone of the TSA separator. The purified second product stream may be recovered from the first stage condenser and admitted into a low pressure port of the ejector, while the condensate stream may be recovered from the second stage condenser and optionally employed for a process within the combustion system. Optionally, at least a portion of a compressed second product stream high in purity at elevated pressure, may be recovered from the compressor and admitted as a motive stream into a high pressure port of the ejector, which may reduce the pressure at the low pressure port of the ejector and assist in reducing the pressure and/or maintaining the reduced pressure in the first stage condenser and second zone of the TSA separator. The second product streams admitted into the low pressure port and high pressure port of the ejector may combine within the ejector, which may then be recovered from the ejector and admitted into a second stage condenser to increase and/or maintain the pressure drop of the fluidly connected upstream condenser and contactor, forming a condensate stream and a purified second product stream which may be higher in purity relative to a purified second product stream recovered from a first stage condenser. The purified second product stream may be recovered from the second stage condenser and/or ejector, and admitted into the compressor, while the condensate stream may be recovered from the second stage condenser and optionally employed for a process within the combustion system. Optionally, additional condenser stages, pumps and/or valves may be employed to further separate the condensable components from the purified second product stream, and increase and/or maintain the pressure drop of the condensers and second zone of the TSA separator.

In another alternative process embodiment, an auxiliary boiler may be employed to produce a very low pressure steam stream for employment as a first regeneration stream for a TSA separator, as an alternative to employing a VLP turbine and a steam stream from the VLP turbine or steam turbine. A water source, for example, a DCC, a compressor and/or a source external to the combustion system, may admit a water stream and/or a condensate stream into an auxiliary boiler to convert the condensate and/or water stream into a very low pressure steam stream, for example, less than about 300 kPa absolute, or specifically less than about 150 kPa absolute. Optionally, at least a portion of a condensate stream may be recovered from at least one of the condenser and DCC, and admitted into the auxiliary boiler for conversion into a portion of the very low pressure steam stream. The auxiliary boiler may be any suitable device, for example, a boiler or heat exchanger, for converting a condensate and/or water stream into a steam stream. In one such embodiment, the very low pressure steam stream may be recovered from the auxiliary boiler and admitted into the second zone of the TSA separator as a first regeneration stream during a second step or first regenerating step of an exemplary TSA process. The very low pressure steam stream may increase the temperature of the at least one adsorbent material in the TSA separator, which may result in desorbing at least a portion of the first component adsorbed on the at least one adsorbent material. At least a portion of the first regeneration stream, for example, third component or $H_2O$, and/or desorbed components, for example, first component or $CO_2$, adsorbed on the at least one adsorbent material in second zone of the TSA separator may form the second product stream, which may be recovered from second zone of the TSA separator. The second product stream may be admitted into at least one condenser, for example, a water separator, a cooler, or a condensing heat exchanger, forming the condensate stream and a purified second product stream which may be high in purity comprising substantially the first component. The purified second product stream may be recovered from the condenser and admitted into a compressor, for example, a multistage compressor with interstage cooling, to produce a compressed second product stream high in purity and at elevated pressure which may be recovered from the compressor and combustion system, and directed to an end use, for example, sequestration, enhanced oil recovery or an industrial process. Optionally, a plurality of condensers may be employed, fluidly connected in series optionally having at least one pump, for example, an ejector, a vacuum pump, a compressor or multistage compressor operating at sub-ambient inlet pressure, or valve, for example, a check valve fluidly connected between condensers and/or downstream to a condenser. An optional ejector may be fluidly connected to recover at least a portion of a compressed second product stream, high in purity and at elevated pressure from the compressor and admit compressed second product stream as a motive stream for the ejector. The purified second product stream recovered from the condenser or pump may be admitted into the compressor.

In a further process embodiment, the optional combustion gas valve may also selectively direct and admit at least a portion of the first treated combustion gas stream into a third zone of the TSA separator as a second regeneration stream during a third step or second regenerating step of an exemplary TSA process, desorbing at least a portion of at least one component, for example, the first component and/or third component, adsorbed on the at least one adsorbent material. At least a portion of the second regeneration stream, for example, first treated combustion gas stream, and/or residual components in third zone of the TSA separator may form a third product stream which may be recovered from third zone of the TSA separator. Third product stream may be directed to flow into a fan which may direct and admit the third product stream to optionally combine with the first treated combustion gas stream for admittance into first zone of the TSA separator as a portion of the feed stream during a first step or adsorbing step of an exemplary TSA process. Admitting and employing a first treated combustion gas stream having reduced quantities or levels of particulates relative to the quantities or levels of particulates in the combustion gas stream and a suitable amount of heat energy or at a suitable temperature desired for desorption of a component from the at least one adsorbent material in third zone of the TSA separator, may advantageously reduce the amount of steam consumed to regenerate the at least one adsorbent materials in the TSA separator and reduce the performance degradation due to particulate contamination of the at least one adsorbent materials in the TSA separator. Alternatively, a second regeneration stream may comprise an air stream, an inert gas stream, or a fluid stream enriched in the first component (relative to the feed stream or first treated combustion gas stream) or comprising substantially the first component, at a pressure and/or temperature suitable for regeneration.

In a process embodiment, a conditioning stream may be recovered from a conditioning source and admitted into a fourth zone of the TSA separator during a fourth step or conditioning step of an exemplary TSA process. The conditioning stream may desorb or sweep components away from and/or change the temperature of the at least one adsorbent material in fourth zone of the TSA separator. At least a portion of the conditioning stream and/or residual components, for example, first component and/or third component, in fourth zone of the TSA separator may form a fourth product stream which may be recovered from fourth zone of the TSA separator at a temperature of, for example, about 40-60° C. The fourth product stream may be admitted into a fan, for example, an induced draft fan, and optionally selectively directed to form at least a portion of the secondary oxidant stream admitted to the oxidant preheater and the boiler and/or optionally selectively directed at least periodically to form at least a portion of the primary oxidant stream admitted to the oxidant preheater and the boiler.

In another process embodiment according to the present disclosure, a process for operating a combustion system incorporating an optional particulate collector (such as for example an electrostatic precipitator), a flue gas desulfurizer and a temperature swing adsorptive gas separator is provided. In one such embodiment, the temperature swing adsorptive gas separator may separate at least a first component, for example, carbon dioxide (herein referred as "$CO_2$"), sulfur oxides, nitrogen, oxygen, and/or heavy metals from a feed stream. A primary oxidant stream employed for a combustor or boiler of the combustion system, may be recovered from one or more primary oxidant sources, admitted into a primary oxidant fan, and into an oxidant preheater to increase the temperature of the primary oxidant stream, such as to greater than about 250-300° C., for example, forming a preheated primary oxidant stream. A fuel source may admit a fuel stream employed for the combustor or boiler, to combine with the preheated primary oxidant stream to form a combined fuel stream which may be admitted into a combustor or boiler. A secondary oxidant stream employed for the combustor or boiler, may be recovered from one or more secondary oxidant sources, admitted into a secondary oxidant fan and into the oxidant preheater to increase the temperature of the secondary oxidant stream, such as to greater than about 250-300° C. for example, forming a preheated secondary oxidant stream before admitting the preheated secondary oxidant stream into the boiler. The preheated secondary oxidant stream and combined fuel stream may be mixed and combusted, producing a combustion gas stream and heat.

An integrated heat exchanger may optionally be incorporated with the combustor or boiler comprises a hot side fluidly connected to recover the combustion gas stream from the combustor and a cold side fluidly connected recover a water and/or condensate stream from a feedwater source. The combustion gas stream may supply heat to the integrated heat exchanger converting the water and/or condensate stream recovered from the feedwater source into a high pressure steam stream in the cold side of the integrated heat exchanger. The high pressure steam stream may be recovered from the hot side of the integrated heat exchanger and optionally admitted into a steam turbine, for example, a multistage steam turbine having a high pressure turbine or stage, an intermediate pressure turbine or stage, and a low pressure turbine or stage, to power, for example, an electric generator, or optionally employed for and admitted into an industrial process.

In one such embodiment, the combustion gas stream may be recovered from the hot side of the integrated heat exchanger and admitted into the oxidant preheater, where the combustion gas stream may supply heat to increase the temperature of the primary and secondary oxidant streams admitted into the oxidant preheater. The combustion gas stream may be recovered from the oxidant preheater and admitted into an optional particulate collector, such as for example an electrostatic precipitator or ESP, for processing where particulates in the combustion gas stream may be separated, forming a first treated combustion gas stream having reduced quantities or levels of particulates relative to the quantities or levels of particulates in the combustion gas stream. In one aspect, the temperature of the first treated combustion gas may be increased to, for example, about 150-200° C. The first treated combustion gas stream may be recovered from the ESP and admitted into a fan, for example, an induced draft fan, which directs and admits the first treated combustion gas stream into a flue gas desulfurizer or FGD where sulfur oxide may be separated from the first treated combustion gas stream forming a third treated combustion gas stream having reduced levels of particulates and reduced levels of sulfur oxides relative to the levels of particulates and sulfur oxides in the combustion gas stream. In one aspect, the third treated combustion gas stream may have a temperature of, for example, about 40-60° C. In one embodiment, the third treated combustion gas stream may be recovered from the FGD and admitted into an optional combustion gas valve, for example, a diverter valve, which may selectively direct and admit at least a portion of the third treated combustion gas stream to a stack for dispersion and release into an ambient environment and recovery from the combustion system.

In one such process embodiment, the optional combustion gas valve may also selectively direct and admit at least a portion of the third treated combustion gas stream into a booster fan which then directs and admits the third treated combustion gas stream into a heat transfer device, for example, a direct contact cooler or DCC to reduce the temperature of the third treated combustion gas stream. In one such embodiment, the temperature of the third treated combustion gas stream may be reduced to, for example, equal to or less than about 50° C., or specifically equal to or less than about 40° C., or more specifically equal to or less than about 30° C., before admitting the third treated combustion gas stream as a feed stream into a first zone of the TSA separator during a first step or adsorbing step of an exemplary TSA process. As the third treated combustion gas stream contacts the at least one adsorbent material in the first zone of the TSA separator at least a portion of the first component (which in one embodiment may comprise, for example, $CO_2$) of third treated combustion gas stream may be adsorbed by the at least one adsorbent material, separating the first component from non-adsorbed components of third treated combustion gas stream. A portion of third treated combustion gas stream and/or non-adsorbed components of third treated combustion gas stream may form a first product stream which may be depleted in the first component relative to the feed stream and be recovered from first zone of TSA separator. The first product stream may be directed to optionally combine with a portion of a third treated combustion gas stream at a higher temperature, forming a fourth treated combustion gas stream which may desirably have sufficient buoyancy to provide for admission into an exhaust stack for dispersion and release into the ambient environment and recovery from the combustion system as a flue gas stream. Optionally, at least a portion of the first product stream may periodically be directed to form a portion of the feed stream admitted into a first zone of the TSA separator during a first step or adsorbing step of an exemplary TSA process. In one embodiment, employing at least a portion of the third treated combustion gas stream as a feed stream for the TSA separator may advantageously reduce the performance degradation of the at least one adsorbent material and/or TSA separator which may occur due to particulate contamination.

In another process embodiment, a first regeneration stream comprising, for example, a third component or a water (herein referred as "$H_2O$") stream in the form of a low pressure steam stream, may be recovered from the steam turbine, for example, at a location between an intermediate pressure turbine and a low pressure turbine, or downstream to a low pressure turbine, and admitted into a very low pressure steam turbine or VLP turbine, to power a mechanically coupled device, for example, an electric auxiliary generator, a water pump or a fan, and advantageously increase the efficiency of the combustion system. In one embodiment, a very low pressure steam stream, such as for example, less than about 300 kPa absolute, or specifically less than about 150 kPa absolute, or more specifically less than about 20 kPa absolute, may be recovered from the VLP turbine and admitted into a second zone of the TSA separator as a first regeneration stream during a second step or first regenerating step of an exemplary TSA process, which may increase the temperature of the at least one adsorbent material, desorbing at least a portion of the first component adsorbed on the at least one adsorbent material. At least a portion of the first regeneration stream, for example, third component or $H_2O$, and/or desorbed components, for example, first component or $CO_2$, adsorbed on the at least one adsorbent material in second zone of the TSA separator may form a second product stream, which may be recovered from second zone of the TSA separator. The second product stream may be admitted into at least one condenser, for example, a water separator, a cooler, or a condensing heat exchanger, separating condensable components, for example, third component or $H_2O$, from the second product stream, forming a condensate stream, and a purified second product stream which may desirably be high in purity comprising substantially the first component, while causing a reduction in pressure in the condenser and fluidly connected second zone of the TSA separator. In one such embodiment, the reduction in pressure may be assisted and/or maintained by employing at least one pump, for example, an ejector, a vacuum pump, a compressor or multistage compressor operating at sub-ambient inlet pressure, or a valve, for example, a check valve, fluidly connected downstream to the condenser. In one aspect, the resulting reduction in pressure in the second zone of the TSA separator may assist in desorption of at least one component adsorbed on the at least one adsorbent material. The purified second product stream may be recovered from at least one condenser and/or pump, and admitted into a compressor, for example, a multistage compressor with interstage cooling, to produce a compressed second product stream high in purity at elevated pressure which may be recovered from the compressor and combustion system, and directed to an end use, for example, sequestration, enhanced oil recovery or an industrial process. Alternatively, a portion of a steam stream, for example, a high pressure steam stream, a low pressure steam stream, or a very low pressure steam stream, may be recovered from the boiler or steam turbine and admitted into a second zone of the TSA separator as a first regeneration stream during a second step or first regenerating step of an exemplary TSA process, and/or a plurality of first regeneration streams may be employed, for example, a low pressure steam stream, a fluid stream enriched in the first component (relative to the feed stream, combustion gas stream or treated combustion gas stream) and/or a fluid stream comprising substantially the first component. Optionally, a plurality of very low pressure steam streams may be recovered from a VLP turbine and admitted into a plurality of TSA separators.

In an alternative process embodiment, a plurality of condensers, for example, a water separator, a cooler, or a condensing heat exchanger, may be employed and fluidly connected in series, optionally having at least one valve, for example, a check valve, and/or at least one pump, for example, an ejector, a vacuum pump, a compressor or multistage compressor operating at sub-ambient inlet pressure, fluidly connected between condensers and/or downstream to a condenser. A second product stream recovered from the second zone of the TSA separator may be admitted into a first stage condenser forming a condensate stream and a purified second product stream high in purity comprising substantially the first component, while causing a pressure drop within the condenser and fluidly connected second zone of the TSA separator. The purified second product stream may be recovered from the first stage condenser and admitted into a low pressure port of the ejector, while the condensate stream may be recovered from the second stage condenser and optionally employed for a process within the combustion system. Optionally, at least a portion of a compressed second product stream high in purity at elevated pressure, may be recovered from the compressor and admitted as a motive stream into a high pressure port of the ejector, which may reduce the pressure at the low pressure port of the ejector and assist in reducing the pressure and/or maintaining the reduced pressure in the first stage condenser and second zone of the TSA separator. The second product streams admitted into the low pressure port and high pressure port of the ejector may combine within the ejector, which may then be recovered from the ejector and admitted into a second stage condenser to increase and/or maintain the pressure drop of the fluidly connected upstream condenser and contactor, forming a condensate stream and a purified second product stream higher in purity relative to the purified second product stream recovered from the first stage condenser. The purified second product stream may be recovered from the second stage condenser and admitted into the compressor, while the condensate stream may be recovered from the second stage condenser and optionally employed for a process within the combustion system. Optionally, additional condenser stages, pumps and/or valves may be employed to further separate the condensable components from the purified second product stream, and increase and/or maintain the pressure drop of the condensers and second zone of the TSA separator.

In an alternative process embodiment, an auxiliary boiler may be employed to produce a steam stream, for example, a very low pressure steam stream, for employment as a regeneration stream, for example, a first regeneration stream, for a TSA separator, as an alternative to employing a VLP turbine and steam from the VLP turbine or steam turbine. A water source, for example, a DCC, a compressor and/or a source external to the combustion system, may admit a water stream and/or a condensate stream into an auxiliary boiler to convert the condensate and/or water stream into a very low pressure steam stream, for example, less than about 300 kPa absolute, or specifically less than about 150 kPa absolute, or more specifically less than about 20 kPa absolute. Optionally, at least a portion of a condensate stream may be recovered from at least one of the condenser and DCC and admitted into the auxiliary boiler for conversion into a portion of the very low pressure steam stream. The auxiliary boiler may be any suitable device, for example, a boiler or heat exchanger, for converting a condensate and/or water stream into a steam stream. The very low pressure steam stream may be recovered from the auxiliary boiler and admitted into the second zone of the TSA separator as a first regeneration stream during a second step or first regenerating step of an exemplary TSA process. In one such embodiment, the very low pressure steam stream may increase the temperature of the at least one adsorbent material in the TSA separator, which may result in desorbing at least a portion of the first component adsorbed on the at least one adsorbent material. At least a portion of the first regeneration stream, for example, third component or $H_2O$, and/or desorbed components, for example, first component or $CO_2$, adsorbed on the at least one adsorbent material in second zone of the TSA separator may form the second product stream, which may be recovered from second zone of the TSA separator. The second product stream may be admitted into at least one condenser, for example, a water separator, a cooler, or a condensing heat exchanger, separating condensable components, for example, third component or $H_2O$, from the second product stream, forming a condensate stream, a purified second product stream which may be high in purity comprising substantially the first component, while causing a reduction in pressure in the condenser and fluidly connected second zone of the TSA separator. In a particular embodiment, the reduction in pressure may be assisted and/or maintained by employing at least one pump, for example, an ejector, a vacuum pump, a compressor or multistage compressor operating at sub-ambient inlet pressure, or a valve, for example, a check valve, fluidly connected downstream to the condenser. In one such embodiment, the resulting reduction in pressure in the second zone of the TSA separator may assist in desorption of at least one component adsorbed on the at least one adsorbent material. The purified second product stream high in purity may be recovered from at least one condenser and admitted into a compressor, for example, a multistage compressor with interstage cooling, to produce a compressed second product stream at elevated pressure which may be recovered from the compressor and combustion system, and directed to an end use, such as for example, sequestration, enhanced oil recovery or an industrial process. Optionally, a plurality of condensers may be employed, fluidly connected in series optionally having at least one pump, for example, an ejector, a vacuum pump, a compressor or multistage compressor operating at sub-ambient inlet pressure, or a valve, for example, a check valve, fluidly connected between condensers and/or downstream to a condenser. An optional ejector may be fluidly connected to recover at least a portion of a compressed second product stream from the compressor and admit at least a portion of the compressed second product stream as a motive stream for the ejector. The second product stream recovered from the condenser or ejector may be admitted into the compressor. Alternatively, a portion of a steam stream, for example, a high pressure steam stream, a low pressure steam stream, or a very low pressure steam stream, may be recovered from the boiler or steam turbine and admitted into a second zone of the TSA separator as a first regeneration stream during a second step or first regenerating step of an exemplary TSA process and/or a plurality of first regeneration streams may be employed, for example, a low pressure steam stream and a fluid stream enriched in the first component (relative to the feed stream or third treated combustion gas stream) or comprising substantially the first component, at a pressure and/or temperature suitable for regeneration. Optionally, a plurality of very low pressure steam streams may be recovered from a VLP turbine and admitted into a plurality of TSA separators.

In a particular process embodiment, a portion of the preheated secondary oxidant stream may be recovered from the oxidant preheater, directed and admitted as a second regeneration stream into a TSA separator during a third step or second regenerating step of an exemplary TSA process. The preheated secondary oxidant stream may be recovered from the oxidant preheater at a suitable temperature, such as for example, of about 250-300° C. In one such embodiment, the preheated secondary oxidant stream may optionally be admitted into an optional supplemental heat exchanger, to reduce the temperature of the preheated secondary oxidant stream to a temperature suitable for a second regeneration stream, such as for example, about 100-180° C., or more particularly about 130-150° C., before admitting into a third zone of the TSA separator. In one such embodiment, the second regeneration stream may desorb at least a portion of at least one component adsorbed, for example, the first component and/or third component, on the at least one adsorbent material in third zone of the TSA separator. At least a portion of the second regeneration stream or preheated secondary oxidant stream, and/or residual components in a third zone of the TSA separator may form a third product stream which may be recovered from the third zone of the TSA separator. In one embodiment, the third product stream may be directed to flow into a fan, for example, an induced draft fan, where the third product stream may be admitted and combined to form at least a portion of the secondary oxidant stream. Admitting and employing a portion of a preheated secondary oxidant stream as a second regeneration stream during a third step or second regenerating step of an exemplary TSA process may advantageously reduce the requirement for additional equipment for new or existing combustion systems incorporating a TSA process and TSA separator, and/or reduce the scope of modifications for retrofitting existing combustion systems. Alternatively, an oxidant preheater may be modified to supply and recover a portion of a preheated secondary oxidant stream at a temperature suitable for a second regeneration stream, such as for example, about 100-180° C., or more particularly about 130-150° C., which may replace the optional supplemental heat exchanger.

In a further alternative process embodiment, a suitable fluid stream, for example one or more of: a portion of a first, second, third or fourth product stream recovered from a TSA separator, an air stream, an oxidant stream, an inert gas stream, a fluid stream enriched in the first component (relative to the feed stream or first treated combustion gas stream) or a fluid stream comprising substantially the first component; may be employed as a second regeneration stream and recovered from a second regeneration stream source, for example, a TSA separator, ambient air, ambient air fan, inert gas source, a compressor or interstage of a compressor for a product stream of a TSA, and admitted into an auxiliary heater to increase the temperature of the fluid stream to a temperature suitable for regeneration of the at least one adsorbent material in a TSA separator or suitable as a regeneration stream prior to admittance into a TSA separator. In one such embodiment, the auxiliary heater may comprise a gas-to-gas heat exchanger, a liquid-to-gas heat exchanger, a combustion heater, a vapour compressor, an interstage cooler of a compressor for a second product stream, an electric heater, or any combination thereof. In one aspect, a portion of a fourth product stream may be recovered from a fourth zone of a TSA separator at a temperature of, for example, about 40-60° C., and admitted into an auxiliary heater, for example, a gas-to-gas heat exchanger, which may increase the temperature to a temperature suitable for regeneration of the at least one adsorbent material in a TSA separator, for example, greater than about 100° C., or more particularly greater than about 130° C., prior to admitting as a second regeneration stream into third zone of the TSA separator. The second regeneration stream may desorb at least a portion of at least one component, for example, the first component and/or third component, adsorbed on the at least one adsorbent material in third zone of the TSA separator. At least a portion of the second regeneration stream, for example, fourth product stream, desorbed and/or residual components in third zone of the TSA separator may form a third product stream which may be recovered from third zone of the TSA separator and directed into a fan, for example, an induced draft fan. Third product stream may be recovered from the fan and directed to optionally combine with the secondary oxidant stream before admitting into secondary oxidant fan and oxidant preheater. Optionally, a portion of a combustion gas stream produced by the boiler may be recovered from the boiler or the oxidant preheater and admitted into the auxiliary heater to supply and transfer heat to the auxiliary heater to increase the temperature of the fluid stream suitable for regeneration of the at least one adsorbent material in a TSA separator or suitable for employment as a second regeneration stream for the TSA separator, for example, a fourth product stream from a TSA separator. The portion of the combustion gas stream may be recovered from the auxiliary heater which may be at a reduced temperature relative to the temperature of the combustion gas stream prior to admitting into the auxiliary heater and admitted into the ESP. Alternatively, any suitable gas or liquid stream, for example, a gas stream from the compressor, or a steam stream recovered from the VLP turbine, may be employed to supply and transfer heat for the auxiliary heater. Alternatively, the auxiliary heater may comprise a combustion heater employing a liquid or gas fuel, for example, a natural gas-fired heater, a propane-fired heater, a gasoline-fired heater, or a diesel-fired heater.

In a further process embodiment, a conditioning stream may be recovered from a conditioning source and admitted into a fourth zone of the TSA separator during a fourth step or conditioning step of an exemplary TSA process. The conditioning stream may desorb or sweep components away from and/or change the temperature of the at least one adsorbent material in the fourth zone of the TSA separator. At least a portion of the conditioning stream and/or residual components, for example, first component and/or third component, in fourth zone of the TSA separator may form a fourth product stream which may be recovered from the fourth zone of the TSA separator at a temperature of, for example, about 40-60° C. The fourth product stream may be admitted into a fan, for example, an induced draft fan, and optionally selectively directed to form at least a portion of the secondary oxidant stream admitted to the oxidant preheater and the boiler, and/or optionally selectively directed at least periodically to form at least a portion of the primary oxidant stream admitted to the oxidant preheater and the boiler. Directing at least a portion of the fourth product stream to form at least a portion of the primary oxidant stream admitted to the oxidant preheater and the boiler may advantageously limit and/or reduce the re-circulation and/or build-up in concentration of a component desorbed third zone of the TSA separator, for example, $CO_2$, if a portion of a preheated secondary oxidant stream is employed as a regeneration stream for the third zone of the TSA separator.

In an alternative embodiment, a pre-regenerating step (subsequent to an adsorbing step and prior to a first regenerating step) may be employed in a pre-regeneration zone (such as located adjacent to a first regeneration zone and/or prior in sequence to a first regeneration zone), comprising introducing a pre-regenerating stream, for example, a steam stream and/or a fluid stream enriched in the first component relative to the feed stream, into a pre-regeneration zone of an adsorbent contactor, desorbing at least a portion of at least one component, for example, a first component, adsorbed on the at least one adsorbent material in the pre-regeneration zone. In one such embodiment, at least a portion of the pre-regenerating stream and a portion of the components desorbed from the at least one adsorbent materials may form a heavy reflux stream which may be recovered from the pre-regeneration zone and the contactor. A reflux step (prior to or subsequent to an adsorbing step) may be employed in a reflux zone (such as located adjacent to a side of an adsorption zone) of the contactor, where the heavy reflux stream may be recycled or admitted into a reflux zone and at least a portion of at least one component, for example, a first component, of the heavy reflux stream may adsorb on the at least one adsorbent material in the reflux zone. In one such embodiment, at least a portion of the non-adsorbed components in the heavy reflux stream may form or produce a fifth product stream which may be depleted in at least one component, for example, first component, relative to the feed stream and may be recovered from the reflux zone, contactor, TSA separator and combustion system.

FIG. 1 is a simplified schematic diagram illustrating a combustion system 1 according to an embodiment of the present disclosure, incorporating a particulate collector (such as for example an electrostatic precipitator or an ESP) 37, a TSA separator 100, and a very low pressure steam turbine (herein referred as "VLP turbine") or VPL turbine 121. TSA separator 100 may be integrated with combustion system 1 for adsorptive gas separation of at least a first component, for example, carbon dioxide (herein referred as "$CO_2$"), sulfur oxides, nitrogen, oxygen, and/or heavy metals, from a multi-component fluid mixture or feed stream, for example, a combustion gas stream or a flue gas stream, produced by a combustor within combustion system 1. Employing a first treated combustion gas stream processed by an ESP having reduced levels of particulates (relative to the level of particulates in the combustion gas stream recovered from the combustor) as a feed stream and/or regeneration stream for a TSA separator may advantageously reduce the performance degradation of an adsorbent material in the TSA separator which may occur due to contamination. Employing a VLP turbine may advantageously increase the overall efficiency of the combustion system.

In one embodiment, combustion system 1 may comprise, optionally a primary oxidant source 20, a primary oxidant fan 22, optionally a secondary oxidant source 26, a secondary oxidant fan 28, an oxidant heater or oxidant preheater 30 having a hot side (not shown in FIG. 1) and a cold side incorporating a primary circuit and a secondary circuit (all not shown in FIG. 1), optionally a fuel source 24, a combustor or a boiler 34 having an integrated heat exchanger (not shown in FIG. 1), a feedwater source 50, a steam turbine 51, for example, a multistage steam turbine having a high pressure turbine or stage, an intermediate pressure turbine or stage, and a low pressure turbine or stage (all not shown in FIG. 1), VLP turbine 121, ESP 37, a fan 39, optionally a valve 101, a booster fan 110, a direct contact cooler or a DCC 113, TSA separator 100 having a first zone 115, a second zone 123, a third zone 131, and a fourth zone 142, a condenser 125, a compressor 127, a fan 133, a fan 144, and a stack 41.

Primary oxidant source 20 may be fluidly connected to primary oxidant fan 22, a primary circuit of the cold side (not shown in FIG. 1) of oxidant preheater 30, and boiler 34. Fuel source 24 may be fluidly connected to boiler 34. Primary oxidant source 20, is fluidly connected to admit a primary oxidant stream 21, for example, an ambient air stream, to optionally form at least a portion of a primary oxidant stream 146, which may be admitted into primary oxidant fan 22, forming a primary oxidant stream 23 which may be admitted into primary circuit of the cold side (not shown in FIG. 1) of oxidant preheater 30, producing a preheated primary oxidant stream 31 at a temperature, for example, of about 250-300° C. Fuel source 24, for example, coal or pulverized coal, is fluidly connected to admit a fuel stream 25 to optionally combine with preheated primary oxidant stream 31, forming a combined fuel stream 33, which may be admitted into boiler 34.

Secondary oxidant source 26, may be fluidly connected to secondary oxidant fan 28, a secondary circuit of the cold side (not shown in FIG. 1) of oxidant preheater 30, and boiler 34. Secondary oxidant source 26, is fluidly connected to admit a secondary oxidant stream 27, for example, an ambient air stream, to optionally form at least a portion of a secondary oxidant stream 148, which may be admitted into secondary oxidant fan 28, forming a secondary oxidant stream 29 which may be admitted into secondary circuit of the cold side (not shown in FIG. 1) of oxidant preheater 30, producing a preheated secondary oxidant stream 32, at a temperature, for example, of about 250-300° C. Preheated secondary oxidant stream 32 may be admitted into boiler 34.

An integrated heat exchanger or specifically a cold side of the integrated heat exchanger (all not shown in FIG. 1) of boiler 34 may be fluidly connected to feedwater source 50, steam turbine 51, and VLP turbine 121. A hot side of the integrated heat exchanger (not shown in FIG. 1) may be fluidly connected to recover a combustion gas stream from boiler 34. Boiler 34 may be fluidly connected to primary and secondary circuits of the cold side (not shown in FIG. 1) and hot side (not shown in FIG. 1) of oxidant preheater 30, ESP 37, fan 39, optional combustion gas valve 101, a booster fan 110, a DCC 113, a first zone 115 of TSA separator 100, stack 41 and an ambient environment 42. Boiler 34 may recover preheated secondary oxidant stream 32 from secondary circuit of the cold side (not shown in FIG. 1) of oxidant preheater 30 and combust at least a portion of a preheated secondary oxidant stream 32 with combined fuel stream 33 to produce a multi-component fluid mixture or a combustion gas stream which may be recovered from the hot side of the integrated heat exchanger (not shown in FIG. 1) and boiler 34 as a combustion gas stream 35, at a temperature, for example, about 500-600° C.

Feedwater source 50 may be fluidly connected to admit at least one of a water stream 52 and/or a condensate stream (not shown in FIG. 1) into a cold side of at least one integrated heat exchanger (not shown in FIG. 1), incorporated with boiler 34. Combustion gas stream 35 may transfer heat to and convert water stream 52 within a cold side of at least one integrated heat exchanger (not shown in FIG. 1), into a high pressure steam stream 53 which may be admitted into a steam turbine 51, for example a multistage steam turbine having a high pressure turbine or stage, an intermediate pressure turbine or stage, and a low pressure turbine or stage, to optionally power an electric generator (not shown in FIG. 1). A low pressure steam stream 54 may be recovered from steam turbine 51, for example, downstream to a low pressure turbine, and recycled to feedwater source 50, via a condenser (not shown in FIG. 1).

Combustion gas stream 35 may be recovered from a hot side of the integrated heat exchanger (not shown in FIG. 1) and boiler 34 and admitted into hot side (not shown in FIG. 3) of oxidant preheater 30 where combustion gas stream 35 may transfer heat to the primary and secondary circuits of the cold side (not shown in FIG. 1) of oxidant preheater 30. Combustion gas stream 35 may be recovered from oxidant preheater 30 as a combustion gas stream 36 at a temperature, for example, about 200-250° C. Combustion gas stream 36 may be admitted into ESP 37 where at least a portion of particulates (not shown in FIG. 1), for example, fly ash, in combustion gas stream 36 may be separated and removed by ESP 37, forming a first treated combustion gas stream 38 with reduced quantities or levels of particulates relative to the quantities or levels of particulates in combustion gas streams 35 and 36. Particulates (not shown in FIG. 1) separated by ESP 37 may be recovered from combustion system 1. First treated combustion gas stream 38 may be at a temperature, for example, of about 150-200° C., and admitted into fan 39, for example, an induced draft fan, forming first treated combustion gas stream 40.

In a system embodiment, optional combustion gas valve 101, for example, a diverter valve, may be fluidly connected to stack 41, ESP 37 via fan 39, first zone 115 of TSA separator 100 via DCC 113 and booster fan 110, and third zone 131 of TSA separator 100. Optional combustion gas valve 101 may be fluidly connected to direct at least a portion of first treated combustion gas stream 40 as a first treated combustion gas stream 102 to optionally form a portion of a second treated combustion gas stream 117 before admission into stack 41 for release and dispersion from combustion system 1 as a flue gas stream 118 into an ambient environment 42; to direct at least a portion of first treated combustion gas stream 40 as a first treated combustion gas stream 103; and/or to direct at least a portion of first treated combustion gas stream 40 as a first treated combustion gas stream 130. Alternatively, optional combustion gas valve 101 may direct at least a portion of first treated combustion gas stream 40 as a first treated combustion gas stream 102, direct at least a portion of first treated combustion gas stream 40 as a first treated combustion gas stream 103, and employ an optional additional flow diverting device (not shown in FIG. 1) to direct a portion of first treated combustion gas stream 103 into first treated combustion gas stream 130.

TSA separator 100 may comprise at least one contactor (not explicitly shown in FIG. 1) which cycles or rotates around a central axis through four zones, for example, a first zone 115, a second zone 123, a third zone 131, and a fourth zone 142, housed in at least one enclosure (not shown in FIG. 1). During an exemplary TSA process according to one embodiment, a first step or an adsorbing step of the TSA process may occur in first zone 115, a second step or a first regenerating step of the TSA process may occur in second zone 123, a third step or a second regenerating step of the TSA process may occur in third zone 131, and a fourth step or a conditioning step of the TSA process may occur in a fourth zone 142.

In a system embodiment according to the present disclosure, first zone 115 of TSA separator 100 may be fluidly connected to ESP 37 via fan 39, optional combustion gas valve 101, booster fan 110, and DCC 113 for admitting a first treated combustion gas stream 114, as a multi-component fluid mixture or feed stream during a first step or adsorbing step of an exemplary TSA process. The multi-component fluid mixture may comprise at least a first component, for example one or more of: carbon dioxide, sulfur oxides, nitrogen, oxygen, and/or heavy metals; and a second component, for example, nitrogen (herein referred as "$N_2$"). First zone 115 of TSA separator 100 may also be fluidly connected to stack 41 and thereby to ambient environment 42. In one embodiment, employing a first treated combustion gas stream recovered from an electrostatic precipitator having reduced levels of particulates (relative to the level of particulates in combustion gas streams 35 and 36) as a feed stream may desirably reduce the performance degradation of an adsorbent material in a TSA separator 100 due to particulate contamination. First treated combustion gas stream 103, may be recovered from optional combustion gas valve 101 and admitted into booster fan 110, forming first treated combustion gas stream 111 and at least a portion of first treated combustion gas stream 112 which may be admitted into DCC 113. The temperature of first treated combustion gas stream 112 may be reduced by DCC 113, to produce first treated combustion gas stream 114, at a temperature of, for example, equal to or less than about 50° C., or more particularly equal to or less than about 40° C., or more specifically equal to or less than about 30° C., which may be admitted into first zone 115 of TSA separator 100 where at least a portion of the first component, for example, $CO_2$, of first treated combustion gas stream 114 may be adsorbed by the at least one adsorbent material (not shown in FIG. 1), separating the first component from non-adsorbed components of first treated combustion gas stream 114. A portion of first treated combustion gas stream 114 and/or non-adsorbed components of first treated combustion gas stream 114 may form a first product stream 116 which may be depleted in the first component relative to the feed stream or first treated combustion gas stream 112 and be recovered from first zone 115 of TSA separator 100 and optionally combined with a portion of first treated combustion gas stream 102, forming second treated combustion gas stream 117 which may be admitted into stack 41 for release and dispersion from combustion system 1 as flue gas stream 118 into ambient environment 42. Optionally, first zone 115 of TSA separator 100 may be fluidly connected with a recycle circuit (not shown in FIG. 1) where at least periodically, at least a portion of first product stream 116 may be recovered from first zone 115 of TSA separator 100 and periodically directed to form a portion of first treated combustion gas stream 112 or first treated combustion gas stream 114 admitted into first zone 115 of TSA separator 100.

In a system embodiment, second zone 123 of TSA separator 100 may be fluidly connected to optional VLP turbine 121, steam turbine 51 and boiler 34 for admitting a fluid stream comprising substantially a third component, for example, or water (herein referred as "$H_2O$") in the form of a very low pressure steam stream 122, for example, less than about 300 kPa absolute, or specifically less than about 150 kPa absolute, or more specifically less than about 20 kPa absolute, as a first regeneration stream during a second step or first regenerating step of an exemplary TSA process. Second zone 123 of TSA separator 100 may be fluidly connected to a condenser 125, a compressor 127, and an end use 129, such as an industrial process, for example. Steam turbine 51 may be fluidly connected, for example, at a location between an intermediate pressure turbine and a low pressure turbine or downstream to a low pressure turbine, to admit a low pressure steam stream 120 into VLP turbine 121 which may power a mechanically coupled device (not shown in FIG. 1), for example, an auxiliary electric generator, a fan or a pump. VLP turbine 121 may be fluidly connected to admit a very low pressure steam stream 122 into second zone 123 of TSA separator 100, increasing the temperature of the at least one adsorbent material (not shown in FIG. 1), and desorbing at least a portion of the first component adsorbed on the at least one adsorbent material (not shown in FIG. 1). At least a portion of the first regeneration stream or very low pressure steam stream 122 and/or desorbed components, for example, first component or $CO_2$, adsorbed on the at least one adsorbent material (not shown in FIG. 1) in second zone 123 of TSA separator 100 may form second product stream 124 which may be recovered from second zone 123 of TSA separator 100. Second product stream 124 may be admitted into condenser 125, for example, a water separator, a cooler, or a condensing heat exchanger, separating condensable components, for example, third component or $H_2O$, from second product stream 124, forming a condensate stream (not shown in FIG. 1) and a purified second product stream 126 which may desirably be high in purity. Purified second product stream 126 may be recovered from condenser 125 and admitted into compressor 127 to produce a compressed second product stream 128 high in purity at elevated pressure, before recovery from combustion system 1 and directing to end use 129, which in one embodiment may comprise for example, sequestration, enhanced oil recovery or an industrial process. Optionally, the inlet of compressor 127 may be operating at a sub-ambient pressure. Optionally at least one pump, for example, an ejector, a vacuum pump, a compressor or multistage compressor operating at sub-ambient inlet pressure, or a valve, for example, a check valve, (all not shown in FIG. 1) may be fluidly connected downstream to condenser 125 and upstream to compressor 127. In an alternative embodiment, second zone 123 of TSA separator 100 may be fluidly connected to recover a very low pressure steam stream 122 as a portion of low pressure steam stream 120 from steam turbine 51 or a portion of high pressure steam stream 53 from boiler 34.

In a system embodiment, third zone 131 of TSA separator 100 may be fluidly connected to ESP 37 via fan 39, and optional combustion gas valve 101 for admitting at least a portion of a first treated combustion gas stream 40 or first treated combustion gas stream 130 as a second regeneration stream during a third step or second regenerating step of an exemplary TSA process. Third zone 131 of TSA separator 100 may also be fluidly connected to first zone 115 of TSA separator 100 via DCC 113 and a fan 133. In one embodiment, first treated combustion gas stream 130 may be at a temperature of, for example, about 100-180° C., or more particularly about 130-150° C., and may be recovered from optional combustion gas valve 101 and admitted into third zone 131 of TSA separator 100, desorbing at least a portion of at least one component, for example, first component and/or third component, adsorbed on the at least one adsorbent material (not shown in FIG. 1). At least a portion of the second regeneration stream or first treated combustion gas stream 130, residual components, and/or desorbed components, in third zone 131 of TSA separator 100 may form a third product stream 132 which may be recovered from third zone 132 of TSA separator 100. Third product stream 132 may be admitted into fan 133 forming a third product stream 134, which may be optionally admitted and combined with first treated combustion gas stream 111 to form a portion of first treated combustion gas stream 112. In one embodiment, employing first treated combustion gas stream 40 and first treated combustion gas stream 130 recovered from ESP 37 via fan 39 having reduced levels of particulates relative to the levels of particulates in combustion gas streams 35 and 36, and a suitable amount of heat energy or at a suitable temperature desired for desorption of a component from the at least one adsorbent material (not shown in FIG. 1), for example, in third zone 131 of TSA separator 100, may advantageously reduce the amount of steam consumed to regenerate the at least one adsorbent materials (not shown in FIG. 1) in TSA separator 100 and reduce the performance degradation due to particulate contamination of the at least one adsorbent materials (not shown in FIG. 1) in TSA separator 100.

In a system embodiment, fourth zone 142 of TSA separator 100 may be fluidly connected to boiler 34 via oxidant preheater 30, primary fan oxidant fan 22, secondary oxidant fan 28, and a fan 144 to optionally admit a fourth product stream 147 as at least a portion of secondary oxidant stream 148 and optionally admit at least a portion of fourth product stream 145 as at least a portion of primary oxidant stream 146, into oxidant preheater 30. Fourth zone 142 of TSA separator 100 may also be fluidly connected to a conditioning source 140, for example, an ambient environment, to admit a conditioning stream 141, for example, an ambient air stream, into fourth zone 142 of TSA separator 100 during a fourth step or conditioning step of an exemplary TSA process. In one such embodiment, conditioning stream 141 may desorb or sweep components away from fourth zone 142 of TSA separator 100 and/or change the temperature of the at least one adsorbent material (not shown in FIG. 1) in fourth zone 142 of TSA separator 100. At least a portion of conditioning stream 141 and/or residual components, for example, first component and/or third component, in fourth zone 142 of TSA separator 100 may form a fourth product stream 143a which may be recovered from fourth zone 142 of TSA separator 100. In one embodiment, fourth product stream 143a (which may be at a temperature of, for example, about 40-60° C.) may be admitted into fan 144, for example, an induced draft fan, to form a fourth product stream 145. Optionally, at least a portion of fourth product stream 145 may be directed to form primary oxidant stream 146 or directed to combine with primary oxidant stream 21 to form primary oxidant stream 146. At least a portion of fourth product stream 145 may form a fourth product stream 147 which may be directed to form secondary oxidant stream 148 or directed to combine with secondary oxidant stream 27 to form secondary oxidant stream 148. In an alternative configuration, fan 144 may be fluidly connected to conditioning source 140 and fourth zone 142 of TSA separator 100 to recover conditioning stream 141 from conditioning source 140 and admit conditioning stream 141 into fourth zone 142 of TSA separator 100.

In an alternative embodiment of combustion system 1, low pressure steam stream 120, VLP turbine 121, and very low pressure steam stream 122 in combustion system 1 may be replaced by an optional auxiliary boiler (not shown in FIG. 1) for converting a condensate stream (not shown in FIG. 1) recovered from condenser 125 and an additional water stream (not shown in FIG. 1) into a steam stream for employment as a first regeneration stream during a second step or first regenerating step of an exemplary TSA process. An alternative configuration according to an exemplary such embodiment is illustrated in FIG. 2.

Figure 2:
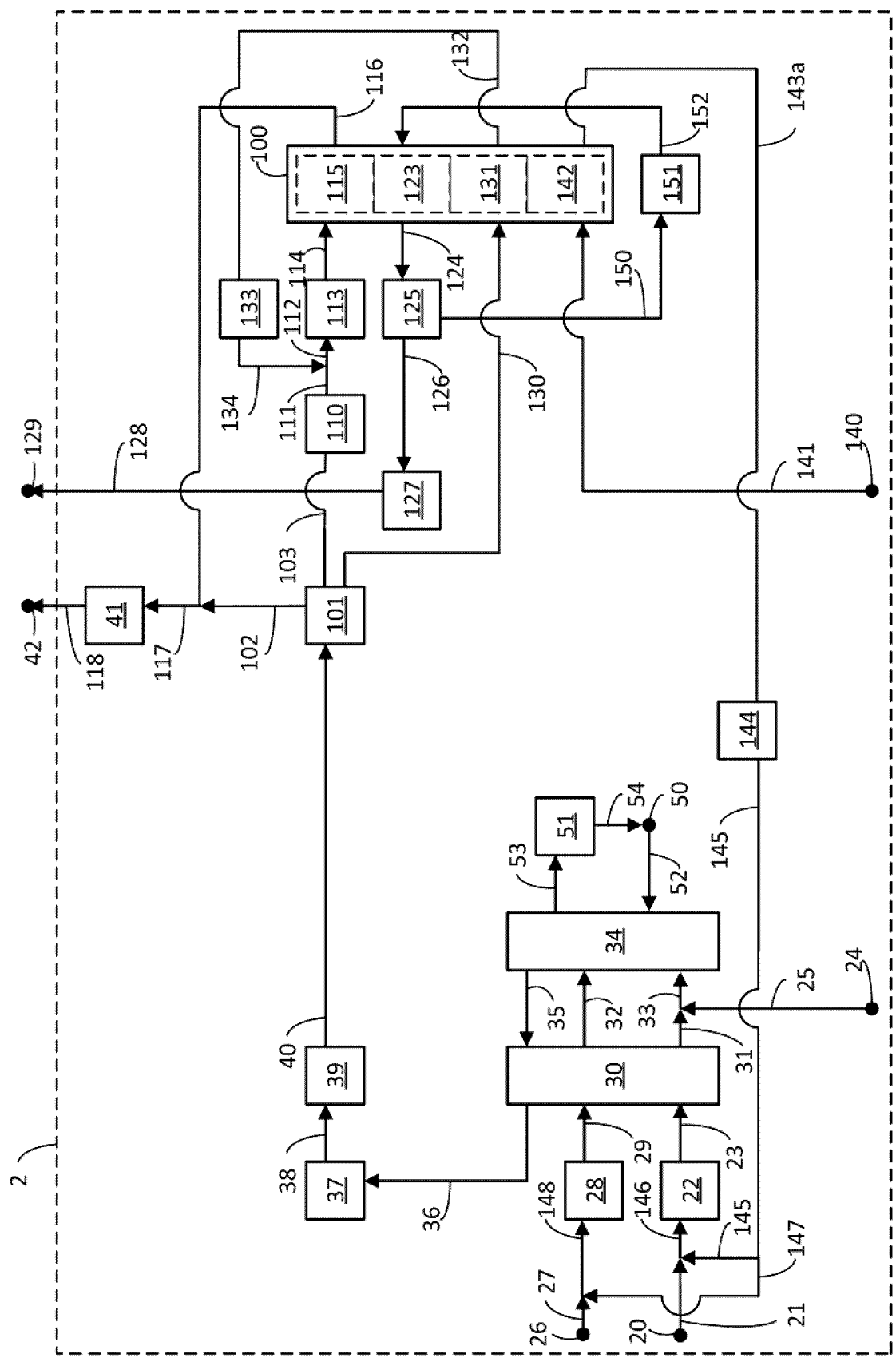
FIG. 2 is a simplified schematic diagram illustrating a combustion system according to another embodiment, comprising an electrostatic precipitator, a temperature swing adsorptive gas separator, and an auxiliary boiler. An auxiliary boiler may be employed to convert a condensate stream and/or a water stream into a low pressure steam stream which may be recovered from the auxiliary boiler and admitted as a first regeneration stream into the temperature swing adsorptive gas separator. A portion of a first treated combustion gas stream recovered from the electrostatic precipitator may be admitted as a feed stream and a second regeneration stream into the temperature swing adsorptive gas separator.

FIG. 2, is a simplified schematic diagram illustrating a combustion system 2 according to an alternative embodiment of the present disclosure, and incorporating an optional particulate collector 37 (which may comprise for example, an electrostatic precipitator or ESP 37), a TSA separator 100, and an auxiliary boiler 151. TSA separator 100 may be integrated with combustion system 2 for adsorptive gas separation of at least a first component (which may comprise for example, one or more of: carbon dioxide, sulfur oxides, nitrogen, oxygen, and/or heavy metals), from a multi-component fluid mixture or feed stream (such as for example, a combustion gas stream or a flue gas stream), produced by a combustor within combustion system 2. Combustion system 2 comprises, optionally primary oxidant source 20, primary oxidant fan 22, optionally secondary oxidant source 26, secondary oxidant fan 28, an oxidant heater or oxidant preheater 30 having a hot side (not shown in FIG. 2) and a cold side incorporating a primary circuit and a secondary circuit (all not shown in FIG. 2), optional fuel source 24, a combustor or boiler 34 having an integrated heat exchanger (not shown in FIG. 2), feedwater source 50, steam turbine 51 for example, a multistage steam turbine having a high pressure turbine or stage, an intermediate pressure turbine or stage, and a low pressure turbine or stage (all not shown in FIG. 2), ESP 37, fan 39, optional combustion gas valve 101, booster fan 110, direct contact cooler or DCC 113, TSA separator 100 having first zone 115 second zone 123 third zone 131 and fourth zone 142, condenser 125, compressor 127, auxiliary boiler 151, fan 133, fan 144, and stack 41.

In an alternative embodiment, second zone 123 of TSA separator 100 and combustion system 2 may be fluidly connected to an auxiliary boiler 151 and condenser 125 for recovering a very low pressure steam stream 152 from auxiliary boiler 151 and admitting very low pressure steam stream 152 as a first regeneration stream during a second step or first regenerating step of an exemplary TSA process. Second zone 123 of TSA separator 100 and combustion system 2 may also be fluidly connected to compressor 127, and end use 129. A water or condensate stream (not shown in FIG. 2) recovered from, for example, DCC 113, compressor 127 and/or a water source (not shown in FIG. 2) and optionally condensate stream 150 recovered from condenser 125 may be admitted into auxiliary boiler 151 to convert the water and/or condensate streams (not shown in FIG. 2) into very low pressure steam stream 152, which in one embodiment may comprise a steam pressure of for example, less than about 300 kPa absolute, or particularly less than about 150 kPa absolute or more particularly less than about 20 kPa absolute. Auxiliary boiler 151 may be any suitable fluid heating device, for example, a boiler or heat exchanger, for converting a condensate and/or water stream into a steam stream.

In an alternative embodiment, a combustion system (not shown in FIG. 1 or 2) incorporates a TSA separator fluidly connected to a flue gas desulfurizer and an optional particulate collector, for example, an electrostatic precipitator, mechanical collector or cyclone, fabric filter or baghouse, wet scrubber or particulate filter (such as a diesel particulate filter), where the TSA separator recovers from a flue gas desulfurizer at least a portion of a third treated combustion gas stream having reduced quantities or levels of sulfur oxides and particulates relative to the quantities or levels of sulfur oxides and particulates in a combustion gas stream recovered from a combustor, for admitting as at least a portion of a feed stream into the TSA separator, or particularly, for admitting as at least a portion of a feed stream into a first zone of the TSA separator. The TSA separator may be integrated with the combustion system for adsorptive gas separation of at least a first component (such as for example one or more of: carbon dioxide, sulfur oxides, nitrogen, oxygen, and/or heavy metals), from a multi-component fluid mixture or feed stream, recovered from the flue gas desulfurizer. The TSA separator may also be fluidly connected to an optional particulate collector for admitting a portion of the first treated combustion gas stream as a regeneration stream into the TSA separator, or particularly, for admitting a portion of the first treated combustion gas stream as a second regeneration stream into the TSA separator, or more particularly, for admitting a portion of the first treated combustion gas stream as a second regeneration stream into a third zone of the TSA separator.

Referring to FIGS. 1 and 2, in an alternative embodiment, combustion system 1 illustrated in FIG. 1, and combustion system 2 illustrated in FIG. 2, may comprise an optional flue gas desulfurizer (not shown in FIGS. 1 and 2) which may be fluidly connected between ESP 37 and a first zone 115 of TSA separator 100, such as via fan 39, DCC 133, booster fan 110 and optional combustion gas valve 101. Third zone 131 of TSA separator 100 may be fluidly connected to ESP 37 via fan 39, upstream to an optional flue gas desulfurizer (not shown in FIGS. 1 and 2), for recovering and admitting at least a portion of a first treated combustion gas stream 40 or first treated combustion gas stream 130 as a second regeneration stream during a third step or second regenerating step of an exemplary TSA process.

Figure 3:
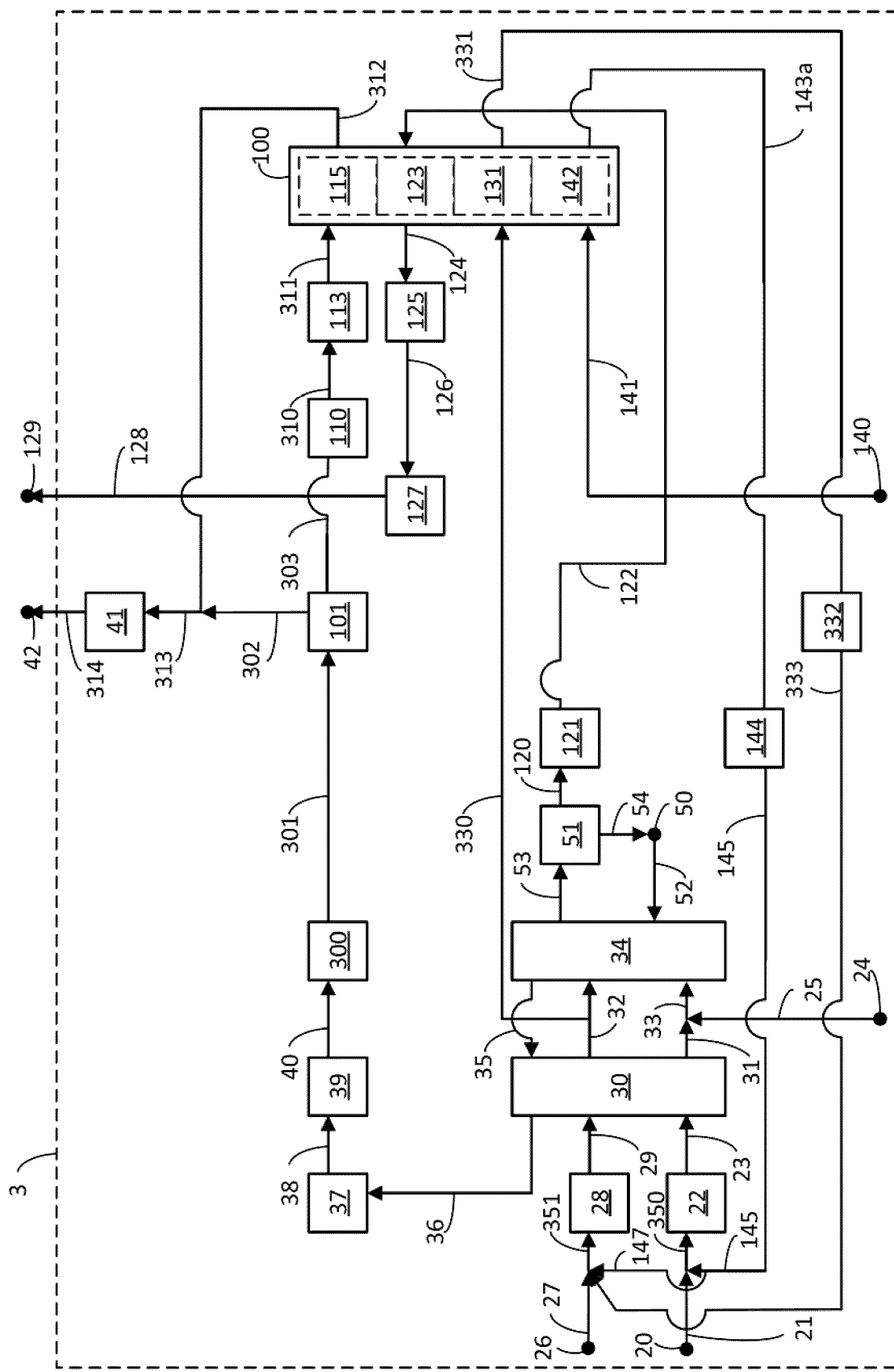
FIG. 3 is a simplified schematic diagram illustrating an embodiment combustion system according to a further embodiment, comprising an electrostatic precipitator, a flue gas desulfurizer, a temperature swing adsorptive gas separator, and a low pressure steam turbine. At least a portion of a third treated combustion gas stream may be recovered from the flue gas desulfurizer, and admitted as a feed stream into the temperature swing adsorptive gas separator. A low pressure steam stream may be recovered from the low pressure steam turbine and admitted as a first regeneration stream into the temperature swing adsorptive gas separator. A portion of a preheated oxidant stream may be recovered from an oxidant preheater and admitted as a second regeneration stream into the temperature swing adsorptive gas separator.

FIG. 3 is a simplified schematic diagram illustrating a combustion system 3 according to an embodiment of the present disclosure, and incorporating a flue gas desulfurizer or FGD 300 and a particulate collector (for example, an electrostatic precipitator) or ESP 37, and TSA separator 100, with a very low pressure steam turbine or a VLP turbine 121. TSA separator 100 may be integrated with combustion system 3 for adsorptive gas separation of at least a first component (such as for example one or more of: carbon dioxide (herein referred as "$CO_2$"), sulfur oxides, nitrogen, oxygen, and/or heavy metals), from a multi-component fluid mixture or feed stream, for example, a combustion gas stream or a flue gas stream, produced by a combustor within combustion system 3. Combustion systems employing an electrostatic precipitator and a flue gas desulfurizer may produce a third treated combustion gas stream having reduced levels of particulates and sulfur oxides (herein referred to as "$SO_x$", relative to the levels of particulates and $SO_x$ in an untreated combustion gas stream recovered from a combustor or boiler. However, in one embodiment, a third treated combustion gas stream recovered from a flue gas desulfurizer may be at a temperature which is less than desired for employment as a regeneration stream for a TSA process and TSA separator. In one embodiment, a portion of a preheated secondary oxidant stream at elevated temperatures, typically employed as an oxidant stream for combustion within a combustor, may be employed as a regeneration stream for a TSA process and TSA separator.

In a particular embodiment, a portion of a preheated secondary oxidant stream 32 employed as an oxidant stream at elevated temperatures for combustion in a boiler 34, or a preheated oxidant stream 330, may be employed as a regeneration stream in TSA separator 100, or particularly, employed as a second regeneration stream in TSA separator 100, or more particularly, employed as a second regeneration stream in third zone 131 of TSA separator 100. In one such embodiment, employing preheated oxidant stream 330 as a regeneration stream may advantageously reduce the amount of steam consumed to regenerate the at least one adsorbent material (not shown in FIG. 3) in TSA separator 100 by employing an alternative to steam as a regeneration stream, and advantageously employ a portion of a fluid stream which typically exists in a conventional combustion or boiler system, without substantially adding additional equipment to combustion system 3.

In one embodiment, combustion system 3 comprises, optionally primary oxidant source 20, primary oxidant fan 22, optionally secondary oxidant source 26, secondary oxidant fan 28, oxidant heater or oxidant preheater 30 having a hot side (not shown in FIG. 3) and a cold side incorporating a primary circuit and a secondary circuit (all not shown in FIG. 3), optional supplemental heat exchanger (not shown in FIG. 3), optional fuel source 24, a combustor or boiler 34 having an integrated heat exchanger (not shown in FIG. 3), feedwater source 50, steam turbine 51 for example, a multistage steam turbine having a high pressure turbine or stage, an intermediate pressure turbine or stage, and a low pressure turbine or stage (all not shown in FIG. 3), VLP turbine 121, ESP 37, fan 39, FGD 300, optional combustion gas valve 101, a booster fan 110, DCC 113, TSA separator 100 having first zone 115, second zone 123, third zone 131, and fourth zone 142, condenser 125, compressor 127, fan 144, a fan 332, and stack 41.

Primary oxidant source 20 may be fluidly connected to primary oxidant fan 22, primary circuit of the cold side (not shown in FIG. 3) of oxidant preheater 30, and boiler 34. Fuel source 24 may be fluidly connected to boiler 34. Primary oxidant source 20, may be fluidly connected to admit primary oxidant stream 21, for example, an ambient air stream, to optionally form at least a portion of a primary oxidant stream 350, which may be admitted into primary oxidant fan 22, forming primary oxidant stream 23, which may be admitted into the primary circuit of the cold side (not shown in FIG. 3) of oxidant preheater 30, producing preheated primary oxidant stream 31, which in one embodiment may be provided at a temperature of, for example, about 250-300° C. Fuel source 24 (which may comprise for example one or more of coal or pulverized coal), is fluidly connected to admit fuel stream 25 to combine with preheated primary oxidant stream 31, forming a combined fuel stream 33, which may be admitted into boiler 34.

In one aspect, a secondary oxidant source 26, may be fluidly connected to secondary oxidant fan 28, secondary circuit of the cold side (not shown in FIG. 3) of oxidant preheater 30, and boiler 34. Secondary oxidant source 26, is fluidly connected to admit secondary oxidant stream 27, for example, an ambient air stream, to optionally form at least a portion of a secondary oxidant stream 351, which may be admitted into secondary oxidant fan 28, forming secondary oxidant stream 29 which may be admitted into secondary circuit of the cold side (not shown in FIG. 3) of oxidant preheater 30, producing preheated secondary oxidant stream 32, which in one embodiment, may be provided at a temperature of, for example, about 250-300° C. Preheated secondary oxidant stream 32 may be admitted into boiler 34.

In one aspect, integrated heat exchanger or specifically a cold circuit of the integrated heat exchanger (all not shown in FIG. 3) of boiler 34 may be fluidly connected to feedwater source 50, steam turbine 51, and VLP turbine 121. A hot side of the integrated heat exchanger (not shown in FIG. 3) may be fluidly connected to receive a combustion gas stream from boiler 34. Boiler 34 may be fluidly connected to primary and secondary circuits of the cold side (not shown in FIG. 3) and hot side (not shown in FIG. 3) of oxidant preheater 30, ESP 37, fan 39, FGD 300, optional combustion gas valve 101, a booster fan 110, a DCC 113, a first zone 115 of TSA separator 100, stack 41 and an ambient environment 42. Boiler 34 may recover preheated secondary oxidant stream 32 from a secondary circuit of the cold side (not shown in FIG. 3) of oxidant preheater 30 and combust at least a portion of a preheated secondary oxidant stream 32 with combined fuel stream 33 to produce a multi-component fluid mixture or a combustion gas stream 35, recovered from the hot side of the integrated heat exchanger (not shown in FIG. 3) from boiler 34, which in one embodiment may be recovered at a temperature of, for example, about 500-600° C.

Feedwater source 50 may be fluidly connected to admit at least one of a water stream 52 and/or a condensate stream (not shown in FIG. 1) into at least one integrated heat exchanger (not shown in FIG. 3) incorporated with boiler 34. Combustion gas stream 35 may transfer heat to and convert water stream 52 within a cold side at least one integrated heat exchanger (not shown in FIG. 3), into a high pressure steam stream 53 which may be admitted into a steam turbine 51 to optionally power an electric generator (not shown in FIG. 3). A low pressure steam stream 54 may be recovered from steam turbine 51, for example, downstream of a low pressure turbine, and recycled to feedwater source 50, via a condenser (not shown in FIG. 3).

Combustion gas stream 35 may be recovered from a hot side of the integrated heat exchanger (not shown in FIG. 3) and boiler 34 and admitted into a hot side (not shown in FIG. 3) of oxidant preheater 30 where combustion gas stream 35 may transfer heat to the primary and secondary circuits of the cold side (not shown in FIG. 3) of oxidant preheater 30. Combustion gas stream 35 may be recovered from oxidant preheater 30 as a combustion gas stream 36, and in one embodiment may be recovered at a temperature of, for example, about 200-250° C. In one such embodiment, combustion gas stream 36 may be admitted into ESP 37 where at least a portion of particulates (not shown in FIG. 3), for example, fly ash, in combustion gas stream 36 may be separated and removed by ESP 37, forming a first treated combustion gas stream 38 with reduced levels of particulates relative to levels of particulates in combustion gas streams 35 and 36. In one aspect, particulates (not shown in FIG. 3) separated by ESP 37 may be recovered from combustion system 3. In a particular embodiment, the first treated combustion gas stream 38 may be at a temperature of, for example, about 150-200° C., and admitted into fan 39, for example, an induced draft fan, forming first treated combustion gas stream 40 which may be admitted into FGD 300. At least a portion of the $SO_x$ in first treated combustion gas stream 40 may be separated and removed by FGD 300, forming a third treated combustion gas stream 301, which may in one embodiment be at a temperature of, for example, about 40-60° C., and with reduced levels of $SO_x$ and particulates relative to the levels of particulates and $SO_x$ in combustion gas streams 35 and 36.

In one embodiment, optional combustion gas valve 101, for example, a diverter valve, may be fluidly connected to FGD 300, stack 41, first zone 115 of TSA separator 100 via DCC 113 and booster fan 110. Optional combustion gas valve 101 may be fluidly connected to direct at least a portion of third treated combustion gas stream 301 as a third treated combustion gas stream 302 to optionally form a portion of a fourth treated combustion gas stream 313 before admission into to stack 41 for release and dispersion from combustion system 3 as a flue gas stream 314 into an ambient environment 42, and/or direct at least a portion of third treated combustion gas stream 301 as a third treated combustion gas stream 303.

TSA separator 100 may comprise at least one contactor (not explicitly shown in FIG. 3) which cycles or rotates around a central axis through four zones, for example, a first zone 115, a second zone 123, a third zone 131, and a fourth zone 142, housed in at least one enclosure (not shown in FIG. 3). During an exemplary TSA process, a first step or an adsorbing step of the TSA process may occur in first zone 115, a second step or a first regenerating step of the TSA process may occur in second zone 123, a third step or a second regenerating step of the TSA process may occur in third zone 131, and a fourth step or a conditioning step of the TSA process may occur in a fourth zone 142.

In one embodiment, first zone 115 of TSA separator 100 may be fluidly connected to ESP 37 such as via fan 39, FGD 300, optional combustion gas valve 101, booster fan 110, and DCC 113 for admitting a third treated combustion gas stream 311, as a multi-component fluid mixture or feed stream during a first step or adsorbing step of an exemplary TSA process. The multi-component fluid mixture may comprise at least a first component (which may comprise for example one or more of: carbon dioxide, sulfur oxides, nitrogen, oxygen, and/or heavy metals), and a second component, for example, nitrogen (herein referred as "$N_2$"). First zone 115 of TSA separator 100 may also be fluidly connected to stack 41 and ambient environment 42. Third treated combustion gas stream 303, may be recovered from optional combustion gas valve 101 and admitted into booster fan 110, forming third treated combustion gas stream 310 which may be admitted into DCC 113. The temperature of third treated combustion gas stream 310 may be reduced by DCC 113, to produce third treated combustion gas stream 311, which in one embodiment may be produced at a temperature of, for example, equal to or less than about 50° C., or more particularly equal to or less than about 40° C., or yet more particularly equal to or less than about 30° C., which may be admitted into first zone 115 of TSA separator 100 where at least a portion of the first component, for example, $CO_2$, of third treated combustion gas stream 311 may be adsorbed by the at least one adsorbent material (not shown in FIG. 3), separating the first component from non-adsorbed components of third treated combustion gas stream 311. In one such embodiment, a portion of third treated combustion gas stream 311 and/or non-adsorbed components of third treated combustion gas stream 311 may form a first product stream 312 which may be depleted in the first component relative to the feed stream or third treated combustion gas stream 311 and be recovered from first zone 115 of TSA separator 100 and optionally combined with a portion of third treated combustion gas stream 302, forming fourth treated combustion gas stream 313 which may be admitted into stack 41 for release and dispersion from combustion system 3 as flue gas stream 314 into ambient environment 42. Optionally, first zone 115 of TSA separator 100 may be fluidly connected with a recycle circuit (not shown in FIG. 3) where at least periodically, at least a portion of first product stream 312 may be recovered from first zone 115 of TSA separator 100 and periodically directed to form a portion of third treated combustion gas stream 310 or third treated combustion gas stream 311 admitted into first zone 115 of TSA separator 100.

In a particular embodiment, second zone 123 of TSA separator 100 may be fluidly connected to optional VLP turbine 121, steam turbine 51 and boiler 34 for recovering and admitting a fluid stream comprising substantially a third component, for example, or water (herein referred as "$H_2O$") in the form of very low pressure steam stream 122, for example, less than about 300 kPa absolute, or specifically less than about 150 kPa absolute, or more specifically less than about 20 kPa absolute, as a first regeneration stream during a second step or first regenerating step of an exemplary TSA process. Second zone 123 of TSA separator 100 may be fluidly connected to a condenser 125, a compressor 127, and an end use 129. Steam turbine 51 may be fluidly connected, for example, at a location between an intermediate pressure turbine and a low pressure turbine or downstream to a low pressure turbine, to admit a low pressure steam stream 120 into VLP turbine 121 which may power a mechanically coupled device (not shown in FIG. 3), for example, an auxiliary electric generator, a fan or a pump. In one embodiment, VLP turbine 121 may be fluidly connected to admit a very low pressure steam stream 122 into second zone 123 of TSA separator 100, increasing the temperature of the at least one adsorbent material (not shown in FIG. 3), and desorbing at least a portion of a first component adsorbed on the at least one adsorbent material (not shown in FIG. 3). At least a portion of the first regeneration stream or very low pressure steam stream 122 and/or desorbed components (comprising for example, a first component such as $CO_2$), adsorbed on the at least one adsorbent material (not shown in FIG. 3) in second zone 123 of TSA separator 100 may form second product stream 124, which may be recovered from second zone 123 of TSA separator 100. Second product stream 124 may be admitted into condenser 125, for example, a water separator, a cooler, or a condensing heat exchanger, separating condensable components, for example, third component or $H_2O$, from second product stream 124, forming a condensate stream (not shown in FIG. 3) and a purified second product stream 126 which may be high in purity. Purified second product stream 126 may be recovered from condenser 125 and admitted into compressor 127 to produce a compressed second product stream 128 high in purity at elevated pressure, before recovery from combustion system 3 and directing to end use 129, which in one embodiment may comprise, for example, sequestration, enhanced oil recovery or an industrial process. Optionally, the inlet of compressor 127 may be operating at a sub-ambient pressure. Optionally at least one pump, for example, an ejector, a vacuum pump, a compressor or multistage compressor operating at sub-ambient inlet pressure, or a valve, for example, a check valve, (all not shown in FIG. 1) may be fluidly connected downstream to condenser 125 and upstream to compressor 127. In an alternative embodiment, second zone 123 of TSA separator 100 may be fluidly connected to recover very low pressure steam stream 122 as a portion of low pressure steam stream 120 from steam turbine 51 or a portion of high pressure steam stream 53 from boiler 34.

In another particular embodiment, third zone 131 of TSA separator 100 may be fluidly connected to the secondary circuit of the cool side (not shown in FIG. 3) of oxidant preheater 30, secondary oxidant fan 28, and secondary oxidant source 26, for admitting at least a portion of preheated secondary oxidant stream 32, as preheated oxidant stream 330 for employment as a second regeneration stream during a third step or second regenerating step of an exemplary TSA process. Third zone 131 of TSA separator 100 may also be fluidly connected to boiler 34 via secondary circuit of the cold side (not shown in FIG. 3) of oxidant preheater 30, secondary oxidant fan 28 and fan 332. In one embodiment, a portion of preheated secondary oxidant stream 32 may be provided at a temperature of, for example, about 250-300° C., and may be admitted into an optional supplemental heat exchanger (not shown in FIG. 3), such as to reduce the temperature of preheated oxidant stream 330 to a temperature suitable for a second regeneration stream, which in one embodiment may be at a temperature of, for example, about 100-180° C., or particularly about 130-150° C. Preheated oxidant stream 330 may be selectively controlled and admitted into third zone 131 of TSA separator 100, desorbing at least a portion of at least one component, for example, first component and/or third component, adsorbed on the at least one adsorbent material (not shown in FIG. 3). At least a portion of the second regeneration stream or preheated oxidant stream 330, residual components, and/or desorbed components, in third zone 131 of TSA separator 100 may form a third product stream 331 which may be recovered from third zone 132 of TSA separator 100. Third product stream 331 may be admitted into fan 332, for example, an induced draft fan, forming a third product stream 333 which may be optionally admitted and combined with secondary oxidant stream 27 to form a portion of secondary oxidant stream 351, before flowing into secondary oxidant fan 28. In one such embodiment, employing a portion of preheated secondary oxidant stream 32 or preheated oxidant stream 330 as a regeneration stream for a TSA separator or a second regeneration stream during a third step or second regenerating step of an exemplary TSA process may advantageously reduce the requirement for addition equipment for new or existing combustion systems incorporating a TSA process and TSA separator, and/or reduce the scope of modifications for retrofitting existing combustion systems. In an alternative embodiment configuration, fan 332 may be fluidly connected to secondary circuit of the cold side (not shown in FIG. 3) of oxidant preheater 30 and third zone 131 of TSA separator 100 to recover preheated oxidant stream 330 from secondary circuit of the cold side (not shown in FIG. 3) of oxidant preheater 30 and admit preheated oxidant stream 330 into third zone 131 of TSA separator 100. Alternatively, a preheated oxidant stream 330 may be recovered from the secondary circuit of the cold side (not shown in FIG. 3) of an oxidant preheater (not shown in FIG. 3) which may be modified to supply preheated oxidant stream 330 at a temperature suitable for a second regeneration stream, which in one embodiment may be for example, at about 100-180° C., or particularly about 130-150° C., which may replace an optional supplemental heat exchanger (not shown in FIG. 3).

In one embodiment, fourth zone 142 of TSA separator 100 may be fluidly connected to boiler 34, via primary and secondary circuits of the cold side (not shown in FIG. 3) of oxidant heater 30, primary oxidant fan 22, secondary oxidant fan 28 and fan 144, to optionally admit at least a portion of a fourth product streams 143a, and 145, as at least a portion of primary oxidant streams 350, 23 and preheated primary oxidant stream 31 and combined fuel stream 33 into boiler 34, and/or optionally admit at least a portion of a fourth product streams 143a, 145, and 147 as at least a portion secondary oxidant streams 351, 29, and preheated oxidant streams 32 into boiler 34. Fourth zone 142 of TSA separator 100 may also be fluidly connected to conditioning source 140, for example, an ambient environment, to admit a conditioning stream 141, for example, an ambient air stream, into fourth zone 142 of TSA separator 100 during a fourth step or conditioning step of an exemplary TSA process. Conditioning stream 141 may desorb or sweep components away from and/or change the temperature of the at least one adsorbent material (not shown in FIG. 3) in fourth zone 142 of TSA separator 100. At least a portion of conditioning stream 141 and/or residual components, for example, first component and/or third component, in fourth zone 142 of TSA separator 100 may form fourth product stream 143a which may be recovered from fourth zone 142 of TSA separator 100. In one embodiment, fourth product stream 143a may be recovered at a temperature of, for example, about 40-60° C., and may be admitted into fan 144 (for example, an induced draft fan), to form fourth product stream 145. At least a portion of fourth product stream 145 may form a fourth product stream 147 which may be optionally directed to form secondary oxidant stream 351 or optionally directed to combine with secondary oxidant stream 27 to form a portion of secondary oxidant stream 351. At least a portion of fourth product stream 145 may be optionally directed at least periodically to form primary oxidant stream 350 or optionally directed to combine with primary oxidant stream 21 to form primary oxidant stream 350. In one such embodiment, directing at least a portion of fourth product stream 145 to form at least a portion of primary oxidant stream 350 may advantageously limit and/or reduce the re-circulation and/or build-up in concentration of a component desorbed in third zone 131 of TSA separator 100, for example, first component or $CO_2$, which may occur in a substantially fluidly connected loop comprising, for example, preheated oxidant stream 330, third zone 131 of TSA separator 100, third product stream 331, fan 332, third product stream 333, secondary oxidant stream 351, secondary oxidant fan 28, secondary oxidant stream 29, secondary circuit of the cold side (not shown in FIG. 3) of oxidant preheater 30 and preheated secondary oxidant stream 32. In an alternative embodiment configuration, fan 144 may be fluidly connected to conditioning source 140 and fourth zone 142 of TSA separator 100 to recover conditioning stream 141 from conditioning source 140 and admit conditioning stream 141 into fourth zone 142 of TSA separator 100.

In an alternative embodiment, combustion system 3, low pressure steam stream 120, VLP turbine 121, and very low pressure steam stream 122 in combustion system 3 may be replaced by an auxiliary boiler (not shown in FIG. 3) for converting a condensate stream (not shown in FIG. 3) recovered from condenser 125 and an additional water stream (not shown in FIG. 3) into a steam stream for employment as a first regeneration stream during a second step or first regenerating step of an exemplary TSA process. An alternative configuration according to an exemplary such embodiment is illustrated in FIG. 4.

Figure 4:
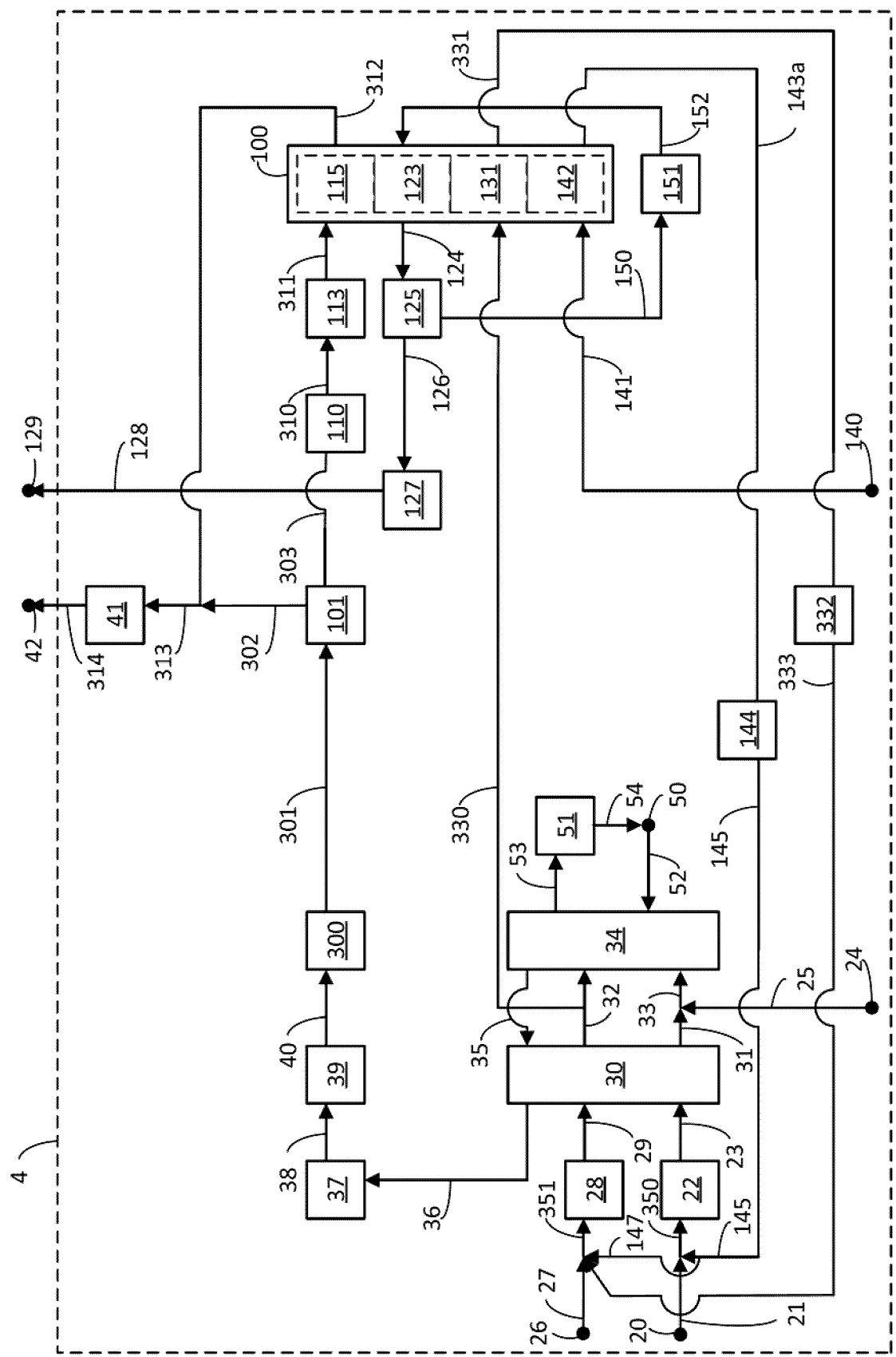
FIG. 4 is a simplified schematic diagram illustrating a combustion system according to an alternative embodiment, comprising an electrostatic precipitator, a flue gas desulfurizer, a temperature swing adsorptive gas separator, and an auxiliary boiler. At least a portion of a third treated combustion gas stream may be recovered from the flue gas desulfurizer, and admitted as a feed stream into the temperature swing adsorptive gas separator. An auxiliary boiler may be employed to convert a condensate stream and/or a water stream into a low pressure steam stream which may be recovered from the auxiliary boiler and admitted as a first regeneration stream into the temperature swing adsorptive gas separator. A portion of a preheated oxidant stream may be recovered from an oxidant preheater and admitted as a second regeneration stream into the temperature swing adsorptive gas separator.

FIG. 4, is a simplified schematic diagram illustrating a combustion system 4 according to an alternative embodiment of the present disclosure, incorporating a flue gas desulfurizer (or FGD) 300 and a particulate collector 37 (for example, an electrostatic precipitator or ESP 37), a TSA separator 100, and an auxiliary boiler 151. TSA separator 100 may be integrated with combustion system 4 for adsorptive gas separation of at least a first component (which in one embodiment may comprise, for example one or more of: carbon dioxide, sulfur oxides, nitrogen, oxygen, and/or heavy metals), from a multi-component fluid mixture or feed stream (which may comprise for example, a combustion gas stream or a flue gas stream), produced by a combustor within combustion system 4. Combustion system 4 comprises, optionally primary oxidant source 20, primary oxidant fan 22, optionally secondary oxidant source 26, secondary oxidant fan 28, an oxidant heater or oxidant preheater 30 having a hot side (not shown in FIG. 4) and a cold side incorporating a primary circuit and a secondary circuit (all not shown in FIG. 4), optional fuel source 24, a combustor or boiler 34 having an integrated heat exchanger (not shown in FIG. 4), feedwater source 50, steam turbine 51 for example, a multistage steam turbine having a high pressure turbine or stage, an intermediate pressure turbine or stage, and a low pressure turbine or stage (all not shown in FIG. 4), ESP 37, fan 39, FGD 300, optional combustion gas valve 101, booster fan 110, a direct contact cooler or DCC 113, TSA separator 100 having first zone 115 second zone 123 third zone 131 and fourth zone 142, condenser 125, compressor 127, auxiliary boiler 151, fan 332, fan 144, and stack 41.

In an alternative embodiment, second zone 123 of TSA separator 100 and combustion system 4 may be fluidly connected to an auxiliary boiler 151 and condenser 125 for recovering a very low pressure steam stream 152 from auxiliary boiler 151 and admitting very low pressure steam stream 152 as a first regeneration stream during a second step or first regenerating step of an exemplary TSA process. Second zone 123 of TSA separator 100 and combustion system 4 may also be fluidly connected to compressor 127, and end use 129. A water or condensate stream (not shown in FIG. 4) recovered from, for example, DCC 113, compressor 127 and/or a water source (not shown in FIG. 4) and optionally condensate stream 150 recovered from condenser 125 may be admitted into auxiliary boiler 151 to convert the water and/or condensate streams (not shown in FIG. 4) into very low pressure steam stream 152, which may in one embodiment comprise a steam stream at a pressure of for example, less than about 300 kPa absolute, or particularly less than about 150 kPa absolute or more particularly less than about 20 kPa absolute. Auxiliary boiler 151 may be any suitable device, for example, a boiler or heat exchanger, for converting a condensate and/or water stream into a steam stream.

Figure 5:
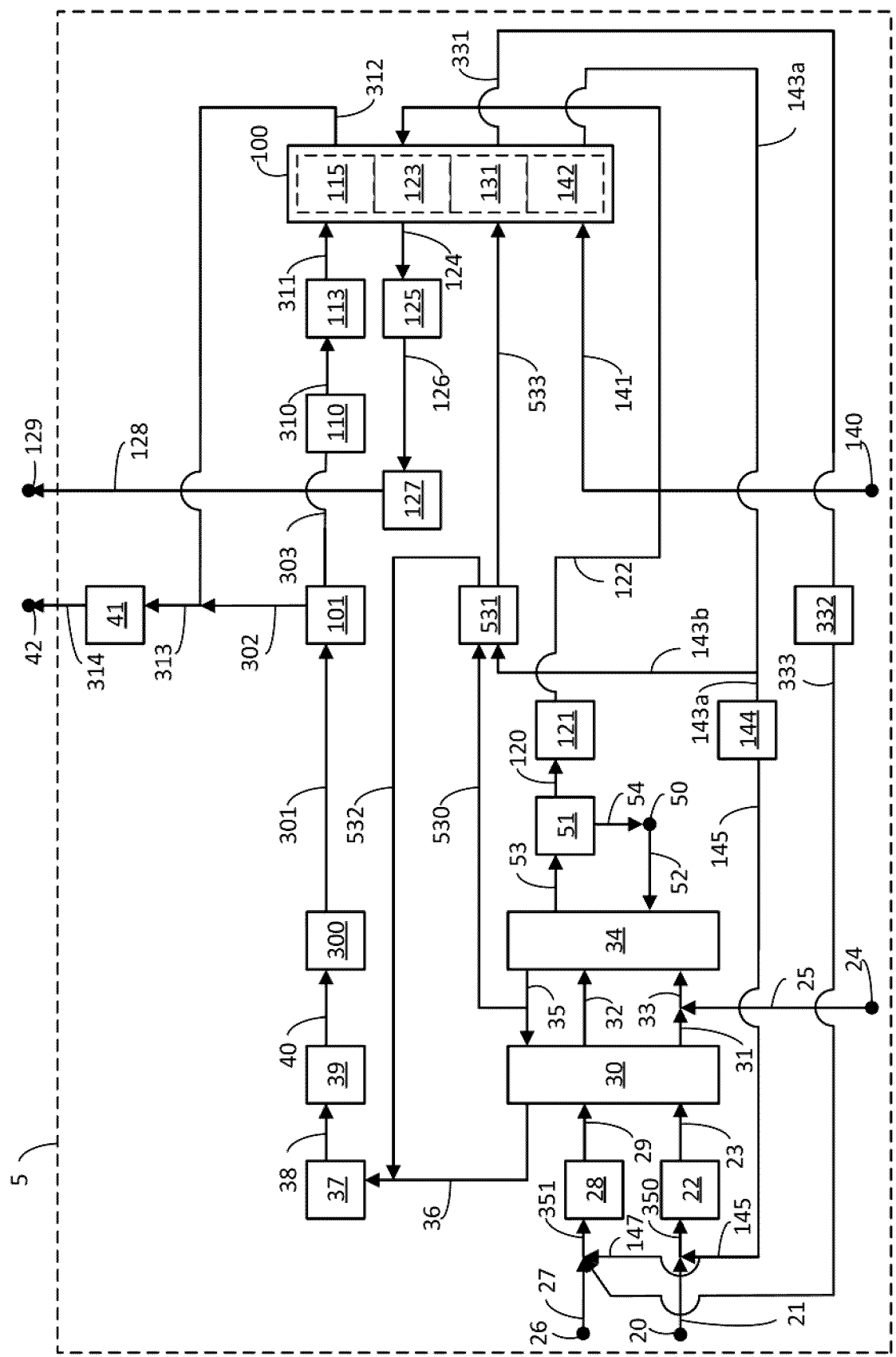
FIG. 5 is a simplified schematic diagram illustrating a combustion system according to a further embodiment, comprising an electrostatic precipitator, a flue gas desulfurizer, a temperature swing adsorptive gas separator, a low pressure steam turbine and an auxiliary heater. At least a portion of a third treated combustion gas stream may be recovered from the flue gas desulfurizer, and admitted as a feed stream into the temperature swing adsorptive gas separator. A low pressure steam stream may be recovered from the low pressure steam turbine and admitted as a first regeneration stream into the temperature swing adsorptive gas separator. An auxiliary heater may be employed to increase the temperature of a portion of a fourth product stream from the temperature swing adsorptive gas separator. The portion of the fourth product stream may be recovered from the auxiliary heater and admitted as a second regeneration stream into the temperature swing adsorptive gas separator.

FIG. 5 is a simplified schematic diagram illustrating an embodiment combustion system 5 incorporating a flue gas desulfurizer or FGD 300 and a particulate collector for example, an electrostatic precipitator or ESP 37, and TSA separator 100, a very low pressure steam turbine or VPL turbine 121 with the addition of an auxiliary heater 531. TSA separator 100 may be integrated with combustion system 5 for adsorptive gas separation of at least a first component, for example, carbon dioxide, sulfur oxides, nitrogen, oxygen, and/or heavy metals, from a multi-component fluid mixture or feed stream, for example, a combustion gas stream or a flue gas stream, produced by a combustor within combustion system 5. Combustion systems employing an electrostatic precipitator and a flue gas desulfurizer may produce a treated combustion system having reduced levels of particulates and $SO_x$ relative to the levels of particulates and $SO_x$ in an untreated combustion gas stream recovered from a combustor or boiler. However, a third treated combustion gas stream recovered from a flue gas desulfurizer may be at a temperature which is less than desired for employment as a regeneration stream for a TSA process and TSA separator. An auxiliary heater may be employed to increase the temperature of a suitable fluid stream for employment as a regeneration stream to a temperature suitable to regenerate the at least one adsorbent material or a temperature suitable for a regeneration stream for a TSA process and TSA separator.

In one embodiment, an auxiliary heater 531, for example, a gas-to-gas heat exchanger, liquid-to-gas heat exchanger, gas-fired heater, liquid-fired heater, solid fuel-fired heater, is employed to increase the temperature of a suitable fluid stream, for example, an air stream, a product stream from a TSA separator, a fluid stream enriched in the first component (relative to, for example, combustion gas stream 35 or third treated combustion gas stream 311), a fluid stream comprising substantially the first component, an oxidant stream typically employed for combustion in a combustor, or an inert gas stream, to a temperature suitable to regenerate the at least one adsorbent material which may then be employed as a regeneration stream in TSA separator 100, or particularly, employed as a second regeneration stream in TSA separator 100, or more particularly, employed as a second regeneration stream in third zone 131 of TSA separator 100. In one such embodiment, employing auxiliary heater 531 may be advantageous in combustion system applications where employing a portion of an oxidant stream typically employed for combustion in a combustor may be undesirable, for example, retrofit of an existing combustion system. Employing an alternative to steam as a regeneration stream, for example, a fourth product stream at elevated temperatures, may advantageously reduce the amount of steam consumed to regenerate the at least one adsorbent material (not shown in FIG. 5) in TSA separator 100.

Combustion system 5 comprises, optionally primary oxidant source 20, primary oxidant fan 22, optionally secondary oxidant source 26, secondary oxidant fan 28, oxidant heater or oxidant preheater 30 having a hot side (not shown in FIG. 5) and a cold side incorporating a primary circuit and a secondary circuit (all not shown in FIG. 5), optional fuel source 24, a combustor or boiler 34 having an integrated heat exchanger (not shown in FIG. 5), feedwater source 50, steam turbine 51, for example, a multistage steam turbine having a high pressure turbine or stage, an intermediate pressure turbine or stage, and a low pressure turbine or stage (all not shown in FIG. 5), VLP turbine 121, ESP 37, fan 39, FGD 300, optional combustion gas valve 101, a booster fan 110, DCC 113, TSA separator 100 having first zone 115, second zone 123, third zone 131, and fourth zone 142, condenser 125, compressor 127, auxiliary heater 531, fan 144, fan 332, and stack 41.

Primary oxidant source 20 may be fluidly connected to primary oxidant fan 22, primary circuit of the cold side (not shown in FIG. 5) of oxidant preheater 30, and boiler 34. Fuel source 24 may be fluidly connected to boiler 34. Primary oxidant source 20, is fluidly connected to admit primary oxidant stream 21, for example, an ambient air stream, to optionally form at least a portion of a primary oxidant stream 350, which may be admitted into primary oxidant fan 22, forming primary oxidant stream 23, which may be admitted into the primary circuit of the cold side (not shown in FIG. 5) of oxidant preheater 30, producing preheated primary oxidant stream 31, at a temperature, for example, about 250-300° C. Fuel source 24, (which in one embodiment may comprise for example, coal or pulverized coal), is fluidly connected to admit fuel stream 25 to combine with preheated primary oxidant stream 31, forming a combined fuel stream 33, which may be admitted into boiler 34.

Secondary oxidant source 26, may be fluidly connected to secondary oxidant fan 28, secondary circuit of the cold side (not shown in FIG. 5) of oxidant preheater 30, and boiler 34. Secondary oxidant source 26, is fluidly connected to admit secondary oxidant stream 27, for example, an ambient air stream, to optionally form at least a portion of a secondary oxidant stream 351, may be admitted into secondary oxidant fan 28, forming secondary oxidant stream 29 which may be admitted into secondary circuit of the cold side (not shown in FIG. 5) of oxidant preheater 30, producing preheated secondary oxidant stream 32, which in one embodiment may be produced at a temperature of, for example, about 250-300° C. Preheated secondary oxidant stream 32 may be admitted into boiler 34.

An integrated heat exchanger or specifically a cold circuit of the integrated heat exchanger (all not shown in FIG. 5) of boiler 34 may be fluidly connected to feedwater source 50, steam turbine 51, and VLP turbine 121. A hot side of the integrated heat exchanger (not shown in FIG. 1) may be fluidly connected to receive a combustion gas stream from boiler 34. Boiler 34 may be fluidly connected to auxiliary heater 531, primary and secondary circuits of the cold side (not shown in FIG. 5) and hot side (not shown in FIG. 5) of oxidant preheater 30, ESP 37, fan 39, FGD 300, optional combustion gas valve 101, a booster fan 110, a DCC 113, a first zone 115 of TSA separator 100, stack 41 and an ambient environment 42. Boiler 34 may recover preheated secondary oxidant stream 32 from secondary circuit of the cold side (not shown in FIG. 5) of oxidant preheater 30 and combust at least a portion of a preheated secondary oxidant stream 32 with combined fuel stream 33 to produce a multi-component fluid mixture or a combustion gas stream 35, recovered from the hot side of the integrated heat exchanger (not shown in FIG. 5) and boiler 34, which in one embodiment may be recovered at a temperature of, for example, about 500-600° C.

Feedwater source 50 may be fluidly connected to admit at least one of a water stream 52 and/or a condensate stream (not shown in FIG. 5) into at least one integrated heat exchanger (not shown in FIG. 5) incorporated with boiler 34. Combustion gas stream 35 may transfer heat to and convert water stream 52 within a cold side of at least one integrated heat exchanger (not shown in FIG. 5), into high pressure steam stream 53 which may be admitted into a steam turbine 51 to optionally power an electric generator (not shown in FIG. 5). A low pressure steam stream 54 may be recovered from steam turbine 51, for example, downstream to a low pressure turbine, and recycled to feedwater source 50, via a condenser (not shown in FIG. 5).

Combustion gas stream 35 may be recovered from a hot side of the integrated heat exchanger (not shown in FIG. 5) and boiler 34 and admitted into hot side (not shown in FIG. 5) of oxidant preheater 30 where combustion gas stream 35 may transfer heat to the primary and secondary circuits of the cold side (not shown in FIG. 5) of oxidant preheater 30. Combustion gas stream 35 may be recovered from oxidant preheater 30 as a combustion gas stream 36, which in one embodiment may be recovered at a temperature of, for example, about 200-250° C. Combustion gas stream 36 may be admitted into ESP 37 where at least a portion of particulates (not shown in FIG. 5), for example, fly ash, in combustion gas stream 36 may be separated and removed by ESP 37, forming a first treated combustion gas stream 38 with reduced levels of particulates relative to the levels of particulates in combustion gas streams 35 and 36. Particulates (not shown in FIG. 5) separated by ESP 37 may be recovered from combustion system 5. In one aspect, first treated combustion gas stream 38 may be recovered at a temperature of, for example, about 150-200° C., and admitted into fan 39, for example, an induced draft fan, forming first treated combustion gas stream 40 which may be admitted into FGD 300. At least a portion of the $SO_x$ in first treated combustion gas stream 40 may be separated and removed by FGD 300, forming a third treated combustion gas stream 301, which in one embodiment may be at a temperature of, for example, about 40-60° C., and with reduced levels of $SO_x$ and particulates relative to the levels of particulates and $SO_x$ in combustion gas streams 35 and 36.

In one embodiment, optional combustion gas valve 101, for example, a diverter valve, may be fluidly connected to FGD 300, stack 41, first zone 115 of TSA separator 100 via DCC 113 and booster fan 110. Optional combustion gas valve 101 may be fluidly connected to direct at least a portion of third treated combustion gas stream 301 as a third treated combustion gas stream 302 to optionally form a portion of a fourth treated combustion gas stream 313 before admitting into to stack 41 for release and dispersion from combustion system 5 as a flue gas stream 314 into an ambient environment 42, and/or direct at least a portion of third treated combustion gas stream 301 as a third treated combustion gas stream 303.

TSA separator 100 may comprise at least one contactor (not shown in FIG. 5) which cycles or rotates around a central axis through four zones, for example, a first zone 115, a second zone 123, a third zone 131, and a fourth zone 142, housed in at least one enclosure (not shown in FIG. 5). During an exemplary TSA process, a first step or an adsorbing step of the TSA process may occur in first zone 115, a second step or a first regenerating step of the TSA process may occur in second zone 123, a third step or a second regenerating step of the TSA process may occur in third zone 131, and a fourth step or a conditioning step of the TSA process may occur in a fourth zone 142.

In one embodiment, first zone 115 of TSA separator 100 may be fluidly connected to ESP 37 such as via fan 39, FGD 300, optional combustion gas valve 101, booster fan 110, and DCC 113, for admitting a third treated combustion gas stream 311, as a multi-component fluid mixture or feed stream during a first step or adsorbing step of an exemplary TSA process. The multi-component fluid mixture may comprise at least a first component (which may comprise, for example, one or more of: carbon dioxide, sulfur oxides, nitrogen, oxygen, and/or heavy metals), and a second component, for example, nitrogen (herein referred as "$N_2$"). First zone 115 of TSA separator 100 may also be fluidly connected to stack 41 and ambient environment 42. Third treated combustion gas stream 303, may be recovered from optional combustion gas valve 101 and admitted into booster fan 110, forming third treated combustion gas stream 310 which may be admitted into DCC 113. The temperature of third treated combustion gas stream 310 may be reduced by DCC 113, to produce third treated combustion gas stream 311, which in one embodiment may be produced at a temperature of, for example, equal to or less than about 50° C., or in particular, equal to or less than about 40° C., or more particularly equal to or less than about 30° C., which may be admitted into first zone 115 of TSA separator 100 where at least a portion of the first component, for example, $CO_2$, of third treated combustion gas stream 311 may be adsorbed by the at least one adsorbent material (not shown in FIG. 5), separating the first component from non-adsorbed components of third treated combustion gas stream 311. A portion of third treated combustion gas stream 311 and/or non-adsorbed components of third treated combustion gas stream 311 may form a first product stream 312 which may be depleted in the first component relative to the feed stream or third treated combustion gas stream 311 and be recovered from first zone 115 of TSA separator 100 and optionally combined with a portion of third treated combustion gas stream 302, forming fourth treated combustion gas stream 313 which may be admitted into stack 41 for release and dispersion from combustion system 5 as flue gas stream 314 into ambient environment 42. Optionally, first zone 115 of TSA separator 100 may be fluidly connected with a recycle circuit (not shown in FIG. 5) where at least periodically, at least a portion of first product stream 312 may be recovered from first zone 115 of TSA separator 100 and periodically directed to form a portion of third treated combustion gas stream 310 or third treated combustion gas stream 311 admitted into first zone 115 of TSA separator 100.

In one embodiment, second zone 123 of TSA separator 100 may be fluidly connected to optional VLP turbine 121, steam turbine 51 and boiler 34 for recovering and admitting a fluid stream comprising substantially a third component, for example, or water (herein referred as "$H_2O$") in the form of very low pressure steam stream 122, for example, which in one embodiment may comprise a steam stream at a pressure of less than about 300 kPa absolute, or in particular less than about 150 kPa absolute, or more particularly less than about 20 kPa absolute, as a first regeneration stream during a second step or first regenerating step of an exemplary TSA process. Second zone 123 of TSA separator 100 may be fluidly connected to a condenser 125, a compressor 127, and an end use 129. Steam turbine 51 may be fluidly connected, for example, at a location between an intermediate pressure turbine and a low pressure turbine or downstream of a low pressure turbine, to admit a low pressure steam stream 120 into VLP turbine 121 which may power a mechanically coupled device (not shown in FIG. 5), for example, an auxiliary electric generator, a fan or a pump. VLP turbine 121 may be fluidly connected to admit a very low pressure steam stream 122 into second zone 123 of TSA separator 100, increasing the temperature of the at least one adsorbent material (not shown in FIG. 5), and desorbing at least a portion of the first component adsorbed on the at least one adsorbent material (not shown in FIG. 5). At least a portion of the first regeneration stream or very low pressure steam stream 122 and/or desorbed components, for example, first component or $CO_2$, adsorbed on the at least one adsorbent material (not shown in FIG. 5) in second zone 123 of TSA separator 100 may form second product stream 124, which may be recovered from second zone 123 of TSA separator 100. Second product stream 124 may be admitted into condenser 125, for example, a water separator, a cooler, or a condensing heat exchanger, separating condensable components, for example, third component or $H_2O$, from second product stream 124, forming a condensate stream (not shown in FIG. 5) and a purified second product stream 126 which may be high in purity. Purified second product stream 126 may be recovered from condenser 125 and admitted into compressor 127 to produce a compressed second product stream 128 high in purity at elevated pressure, before recovery from combustion system 5 and directing to end use 129, which in one embodiment may comprise, for example, sequestration, enhanced oil recovery or an industrial process. Optionally, the inlet of compressor 127 may be operating at a sub-ambient pressure. Optionally at least one pump, for example, an ejector, a vacuum pump, a compressor or multistage compressor operating at a sub-ambient inlet pressure, or a valve, for example, a check valve, (all not shown in FIG. 5) may be fluidly connected downstream to condenser 125 and upstream to compressor 127. In an alternative embodiment, second zone 123 of TSA separator 100 may be fluidly connected to recover very low pressure steam stream 122 from steam turbine 51 or a portion of high pressure steam stream 53 from boiler 34.

In one embodiment, third zone 131 of TSA separator 100 may be fluidly connected to an auxiliary heater 531, fourth zone 142 of TSA separator 100, or conditioning source 140, for recovering and admitting a fourth product stream 533, as a second regeneration stream during a third step or second regenerating step of an exemplary TSA process. Third zone 131 of TSA separator 100 may also be fluidly connected to boiler 34 via secondary circuit of the cold side (not shown in FIG. 5) of oxidant preheater 30, secondary oxidant fan 28 and fan 332. A fourth product stream 143a, which in one embodiment may be at a temperature of, for example, about 40-60° C., may be recovered from fourth zone 142 of TSA separator 100 where a portion of fourth product stream 143a or fourth product stream 143b may be admitted into auxiliary heater 531 which may increase the temperature of fourth product stream 143b to a temperature suitable to regenerate the at least one adsorbent material forming a second regeneration stream or fourth product stream 533, which in one embodiment may be at a temperature of, for example, about 100-180° C., or more particularly about 130-150° C. Fourth product stream 533 may be selectively controlled and admitted as a second regeneration stream into third zone 131 of TSA separator 100, desorbing at least a portion of at least one component, for example, first component and/or third component, adsorbed on the at least one adsorbent material (not shown in FIG. 5). At least a portion of the second regeneration stream or fourth product stream 533, residual components, and/or desorbed components, in third zone 131 of TSA separator 100 may form third product stream 331 which may be recovered from third zone 132 of TSA separator 100. Third product stream 331 may be admitted into fan 332, for example, an induced draft fan, forming a portion of third product stream 333 which may be optionally admitted and combined with secondary oxidant stream 27 to form a portion of secondary oxidant stream 351, before flowing into secondary oxidant fan 28. Auxiliary heater 531 may be fluidly connected to boiler 34 and ESP 37, for recovering combustion gas stream 530 from boiler 34 and admitting combustion gas stream 530 into auxiliary heater 531, and for recovering combustion gas stream 532 from auxiliary boiler 531 and admitting combustion gas stream 532 into ESP 37 or admitting combustion gas stream 532 to combine with combustion gas stream 36 prior to admitting into ESP 37. Combustion gas stream 532 recovered from auxiliary heater 531 may be at a reduced or lower temperature relative to combustion gas stream 530 admitted into auxiliary heater 531.

In an alternative embodiment configuration, fan 332 may be fluidly connected to fourth zone 142 of TSA separator 100 and auxiliary heater 531 to recover fourth product stream 143a or fourth product stream 143b from fourth zone 142 of TSA separator 100 and admit fourth product stream 143a or fourth product stream 143b into auxiliary heater 531, or fan 332 may be fluidly connected to auxiliary heater 531 and third zone 131 of TSA separator 100 to recover fourth product stream 533 from auxiliary heater 531 and admit fourth product stream 533 as a regeneration stream, for example, second regeneration stream into third zone 131 of TSA separator 100. Alternatively, auxiliary heater 531 may be fluidly connected to hot side (not shown in FIG. 5) of oxidant preheater 30 and ESP 37, for recovering combustion gas stream 530 from hot side (not shown in FIG. 5) of oxidant preheater 30 and admitting combustion gas stream 530 into auxiliary heater 531, and for recovering combustion gas stream 532 from auxiliary boiler 531 and admitting combustion gas stream 532 into ESP 37. Alternatively: auxiliary heater 531 may be fluidly connected to second zone 123 of TSA separator 100 and third zone 131 of TSA separator 100, receiving at least periodically at least a portion of second product stream 124, increasing the temperature of at least a portion of second product stream 124 forming a second regeneration stream and admitting at least a portion of second product stream 124 at an elevated temperature into third zone 131 of TSA separator 100 as a second regeneration stream. In one embodiment, auxiliary heater 531 may be fluidly connected to condenser 125 and third zone 131 of TSA separator 100, receiving at least periodically at least a portion of purified second product stream 126, increasing the temperature of at least a portion of second product stream 126 forming a second regeneration stream and admitting at least a portion of purified second product stream 126 at an elevated temperature into third zone 131 of TSA separator 100 as a second regeneration stream, and auxiliary heater 531 may be fluidly connected to compressor 127 to recover at least a portion of a compressed second product stream from an interstage of compressor 127 or at least a portion of compressed second product stream 128, increasing the temperature of at least a portion of compressed second product stream and admitting at least a portion of compressed second product stream at an elevated temperature into third zone 131 of TSA separator 100 as a second regeneration stream.

In one embodiment, fourth zone 142 of TSA separator 100 may be fluidly connected to boiler 34, via primary and secondary circuits of the cold side (not shown in FIG. 5) of oxidant heater 30, primary oxidant fan 22, secondary oxidant fan 28 and fan 144, to optionally admit at least a portion of a fourth product streams 143a, and 145, as at least a portion of primary oxidant streams 350, 23 and preheated primary oxidant stream 31 and combined fuel stream 33 into boiler 34, and/or optionally admit at least a portion of a fourth product streams 143a, 145, and 147 as at least a portion secondary oxidant streams 351, 29, and preheated oxidant streams 32 into boiler 34. Fourth zone 142 of TSA separator 100 may also be fluidly connected to conditioning source 140, for example, an ambient environment, to admit a conditioning stream 141, for example, an ambient air stream, into fourth zone 142 of TSA separator 100 during a fourth step or conditioning step of an exemplary TSA process. In one embodiment, conditioning stream 141 may desorb or sweep components away from and/or change the temperature of the at least one adsorbent material (not shown in FIG. 5) in fourth zone 142 of TSA separator 100. At least a portion of conditioning stream 141 and/or residual components, for example, first component and/or third component, in fourth zone 142 of TSA separator 100 may form fourth product stream 143a which may be recovered from fourth zone 142 of TSA separator 100. In one aspect, fourth product stream 143a may be recovered at a temperature of, for example, about 40-60° C., and may be admitted into fan 144, for example, an induced draft fan, to form fourth product stream 145. At least a portion of fourth product stream 145 may form a fourth product stream 147 which may be optionally directed to form secondary oxidant stream 351 or optionally directed to combine with secondary oxidant stream 27 to form a portion of secondary oxidant stream 351. At least a portion of fourth product stream 145 may be optionally directed at least periodically to form primary oxidant stream 350 or optionally directed to combine with primary oxidant stream 21 to form primary oxidant stream 350. In an alternative embodiment configuration, fan 144 may be fluidly connected to conditioning source 140 and fourth zone 142 of TSA separator 100 to recover conditioning stream 141 from conditioning source 140 and admit conditioning stream 141 into fourth zone 142 of TSA separator 100 or fluidly connected to fourth zone 142 of TSA separator 100, auxiliary heater 531, primary oxidant fan 22 and secondary oxidant fan 28 to recover fourth product stream 143a from fourth zone 142 of TSA separator 100, and admit fourth product streams 143b, 145 and 147 into auxiliary boiler 531, primary oxidant fan 22 and secondary oxidant fan 28.

In an alternative embodiment, combustion system 5, low pressure steam stream 120, VLP turbine 121, and very low pressure steam stream 122 in combustion system 5 may be replaced by an auxiliary boiler (not shown in FIG. 5) for converting a condensate stream (not shown in FIG. 5) recovered from condenser 125 and an additional water stream (not shown in FIG. 5) into a steam stream for employment as a first regeneration stream during a second step or first regenerating step of an exemplary TSA process. An alternative configuration according to an exemplary such embodiment is illustrated in FIG. 6.

Figure 6:
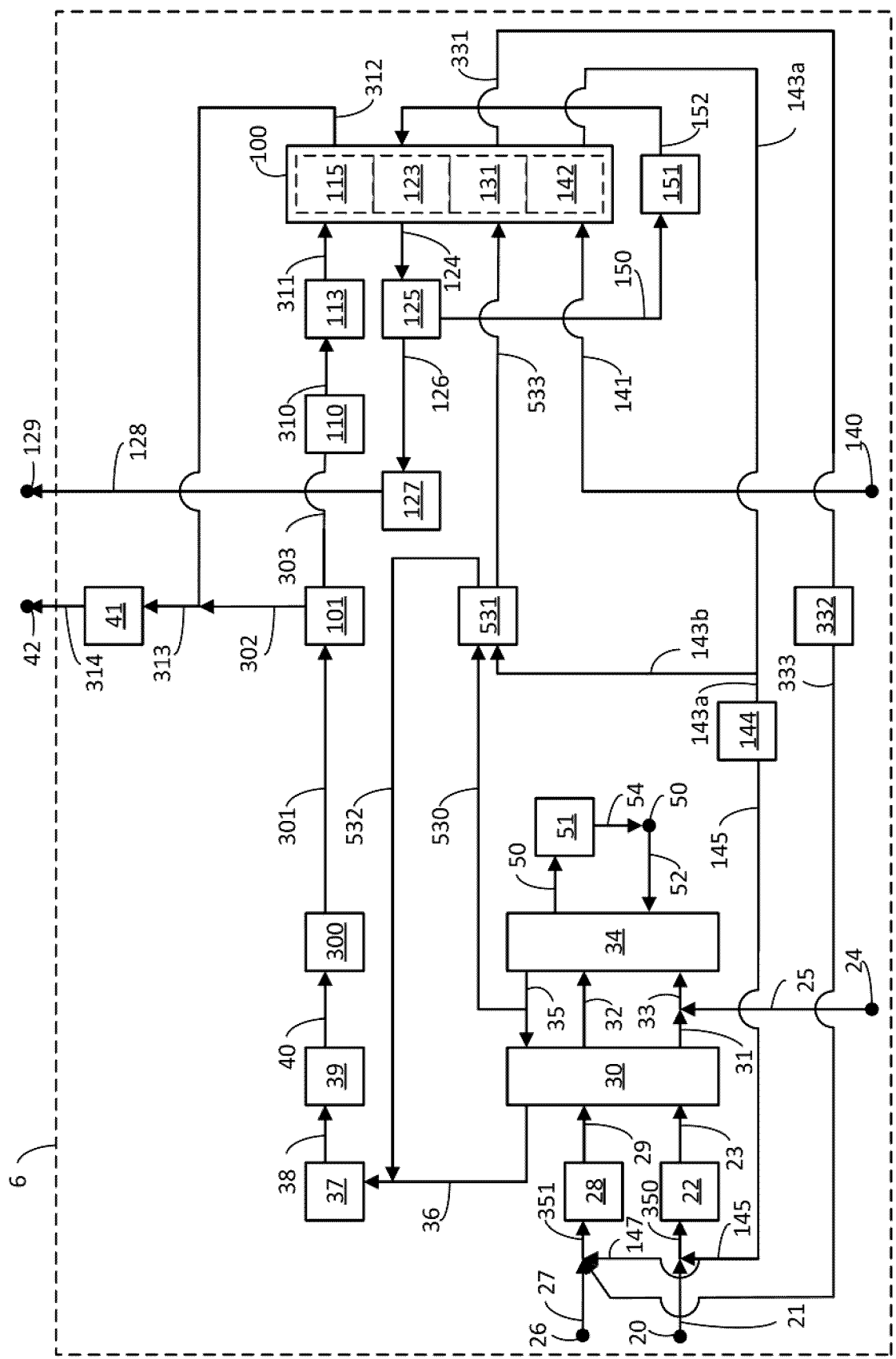
FIG. 6 is a simplified schematic diagram illustrating a combustion system according to another embodiment, comprising an electrostatic precipitator, a flue gas desulfurizer, a temperature swing adsorptive gas separator, an auxiliary boiler and an auxiliary heater. At least a portion of a third treated combustion gas stream may be recovered from the flue gas desulfurizer, and admitted as a feed stream into the temperature swing adsorptive gas separator. An auxiliary boiler may be employed to convert a condensate stream and/or a water stream into a low pressure steam stream which may be recovered from the auxiliary boiler and admitted as a first regeneration stream into the temperature swing adsorptive gas separator. An auxiliary heater may be employed to increase the temperature of a portion of a fourth product stream from the temperature swing adsorptive gas separator. The portion of the fourth product stream may be recovered from the auxiliary heater and admitted as a second regeneration stream into the temperature swing adsorptive gas separator.

FIG. 6, is a simplified schematic diagram illustrating a combustion system 6 according to an alternative embodiment of the present disclosure, and incorporating a flue gas desulfurizer or FGD 300 and a particulate collector 37 (for example, an electrostatic precipitator or ESP 37), and TSA separator 100, auxiliary heater 531, and auxiliary boiler 151. TSA separator 100 may be integrated with combustion system 6 for adsorptive gas separation of at least a first component (which in one embodiment may comprise, for example, one or more of: carbon dioxide, sulfur oxides, nitrogen, oxygen, and/or heavy metals), from a multi-component fluid mixture or feed stream, for example, a combustion gas stream or a flue gas stream, produced by a combustor within combustion system 6. Combustion system 6 comprises, optionally primary oxidant source 20, primary oxidant fan 22, optionally secondary oxidant source 26, secondary oxidant fan 28, an oxidant heater or oxidant preheater 30 having a hot side (not shown in FIG. 6) and a cold side incorporating a primary circuit and a secondary circuit (all not shown in FIG. 6), optionally fuel source 24, a combustor or boiler 34 having an integrated heat exchanger (not shown in FIG. 6), feedwater source 50, steam turbine 51 (which in one embodiment may comprise for example, a multistage steam turbine having a high pressure turbine or stage, an intermediate pressure turbine or stage, and a low pressure turbine or stage) (all not shown in FIG. 6), ESP 37, fan 39, FGD 300, optional combustion gas valve 101, booster fan 110, a direct contact cooler or DCC 113, TSA separator 100 having first zone 115 second zone 123 third zone 131 and fourth zone 142, condenser 125, compressor 127, auxiliary heater 531, auxiliary boiler 151, fan 332, fan 144, and stack 41.

In an alternative embodiment, second zone 123 of TSA separator 100 and combustion system 6 may be fluidly connected to an auxiliary boiler 151 and condenser 125 for recovering a very low pressure steam stream 152 from auxiliary boiler 151 and admitting very low pressure steam stream 152 as a first regeneration stream during a second step or first regenerating step of an exemplary TSA process. Second zone 123 of TSA separator 100 and combustion system 6 may also be fluidly connected to compressor 127, and end use 129. A water or condensate stream (not shown in FIG. 6) recovered from, for example, DCC 113, compressor 127 and/or a water source (not shown in FIG. 6) and optionally condensate stream 150 recovered from condenser 125 may be admitted into auxiliary boiler 151 to convert the water and/or condensate streams (not shown in FIG. 6) into very low pressure steam stream 152, for example, which in one embodiment may comprise a steam stream at a pressure less than about 300 kPa absolute, or in particular less than about 150 kPa absolute or more particularly less than about 20 kPa absolute. Auxiliary boiler 151 may be any suitable device, for example, a boiler or heat exchanger, for converting a condensate and/or water stream into a steam stream.

Figure 7:
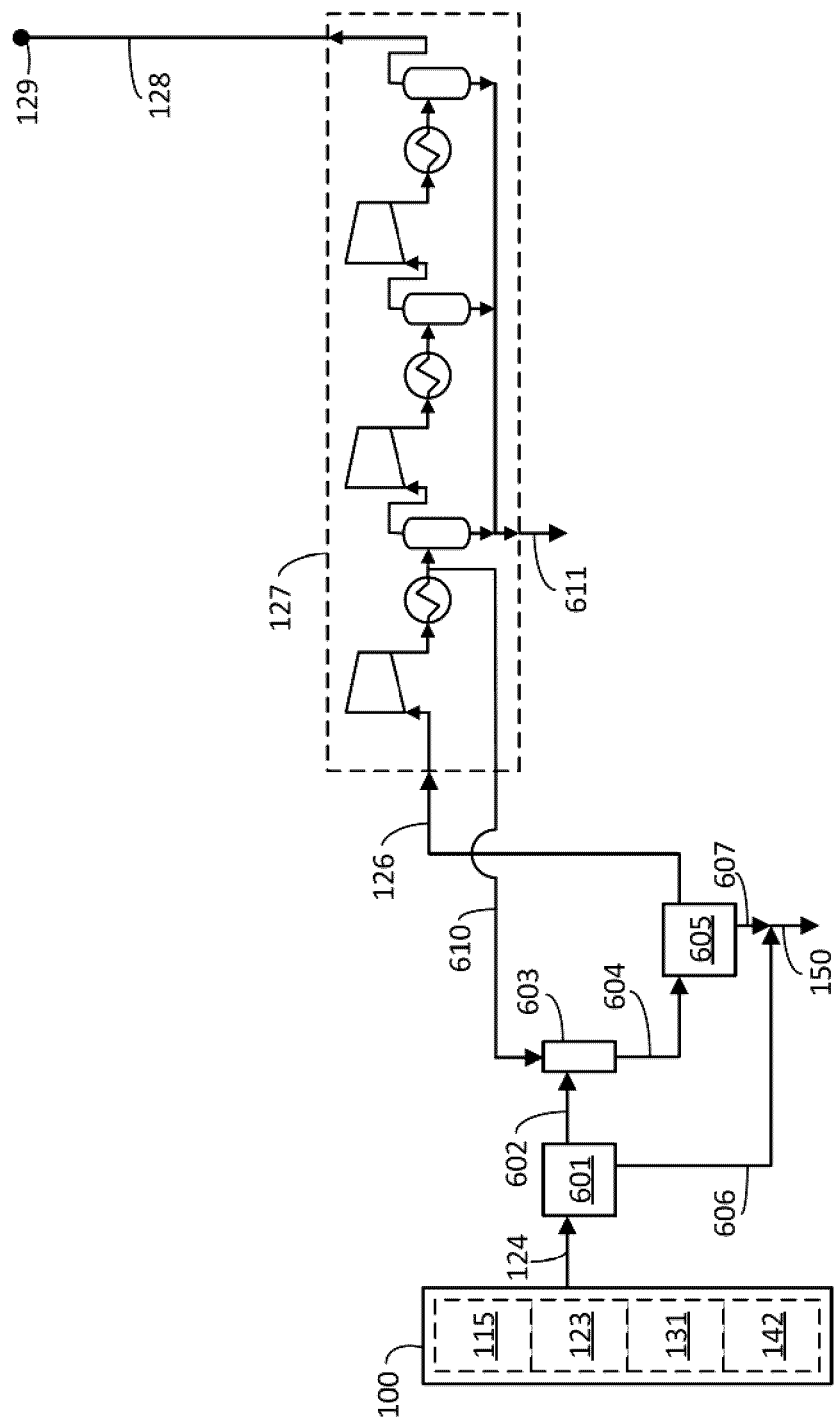
FIG. 7 is a simplified schematic diagram illustrating a temperature swing adsorptive gas separator configuration according to an embodiment of the present disclosure, comprising a first stage condenser, an ejector, a second stage condenser, and a compressor, for recovering a second product stream from the temperature swing adsorptive gas separator.

FIG. 7 illustrates an exemplary configuration employing a first stage condenser, a pump or specifically an ejector, a second stage condenser, and a compressor, which may be employed for the combustion systems 1 through 6, and TSA separator described above, in accordance with embodiments of the present disclosure. Second zone 123 of TSA separator 100 is fluidly connected to a first stage condenser 601, an ejector 603, a second stage condenser 605, compressor 127, and an end use 129. First stage condenser 601 and second stage condenser 605 may be, for example, a condenser, a water separator, a cooler, or a condensing heat exchanger, and may be fluidly connected to a coolant source (not shown in FIG. 7). A coolant stream, for example, an ambient air stream or a water stream, (all not shown in FIG. 7) may be supplied to and recovered from first stage condenser 601 and second stage condenser 605, to cool and remove heat from first stage condenser 601 and second stage condenser 605. Second product stream 124 may be recovered from second zone 123 of TSA separator 100 and admitted into first stage condenser 601 where condensable components, for example, third component or $H_2O$, may condense, forming a condensate stream 606 and a purified second product stream 602 high in purity while creating pressure drop within first stage condenser 601 and second zone 123 of TSA separator 100. Purified second product stream 602 may be recovered from first stage condenser 601 and admitted into a low pressure port (not shown in FIG. 7) of ejector 603. A compressed second product stream 610, high in purity and at elevated pressure, may be recovered from compressor 127, for example, after a first compression stage, and admitted as a motive stream into a high pressure port (not shown in FIG. 7) of ejector 603, which may further reduce the pressure and/or maintaining the reduced pressure in first stage condenser 601 and second zone 123 of TSA separator 100. Reducing the pressure in second zone 123 of TSA separator 100 may advantageously assist in desorbing the components adsorbed on the at least one adsorbent material and reduce the consumption of steam during the regeneration process and first regeneration step. A purified second product stream 604 may be recovered from ejector 603 and admitted into second stage condenser 605, where condensable components, for example, third component or $H_2O$, may condense, forming a condensate stream 607 and purified second product stream 126 high in purity. Purified second product stream 126 may be recovered from second stage condenser 605 and admitted into compressor 127 which may increase the pressure of purified second product stream 126 to produce compressed second product stream 128 which may be recovered from compressor 127 and directed to end use 129. In one embodiment, condensate stream 606 may be recovered from first stage condenser 601 and condensate stream 607 may be recovered from second stage condenser 605 optionally with at least one pump (not shown in FIG. 7) and optionally combined to form condensate stream 150. Compressor 127 may produce a condensate stream 611 which may be recovered from compressor 127. Optionally, additional condensers, condenser stages, pumps and valves (all not shown in FIG. 7) fluidly connected in series may be employed. Optionally, compressor 127 may be fluidly connected to a TSA separator, for example, a first regeneration zone or a second regeneration zone, optionally via an auxiliary heater or auxiliary heat exchanger, where at least a portion of a compressed second product stream may be recovered downstream of compressor 127 or at an interstage of compressor 127 for employment as a regeneration stream, for example, as at least a portion of a first and/or a second regeneration stream. The auxiliary heater or auxiliary heat exchanger may increase the temperature of the compressed second product stream to a temperature suitable for regeneration of the at least one adsorbent material or a temperature suitable for a regeneration stream.

Referring to FIGS. 1, 2, 3, 4, 5, and 6, in alternative embodiments, TSA separator 100 may comprise two or more zones where the zones and fluid streams are stationary in relation to a contactor which moves through the zones, two or more zones where the fluid streams and zones may move in relation to a stationary contactor, a plurality of contactors housed in one enclosure, or a plurality of contactors housed in individual enclosures. TSA separator 100 may comprise additional zones, for example, a pre-regeneration zone located adjacent to and/or prior in sequence to a regeneration zone and regenerating step or a first regeneration zone and first regenerating step, and a reflux zone located adjacent to and/or one of prior in sequence or subsequent in sequence to an adsorption zone and adsorbing step, where the pre-regeneration zone and reflux zone may be fluidly connected to recover a heavy reflux stream from the pre-regeneration zone and admit the heavy reflux stream into the reflux zone, the pre-regeneration zone may be fluidly connected to receive a pre-regeneration stream, for example, a steam stream, an air stream, or a stream enriched in the first component, from a pre-regeneration stream source, and the reflux zone may be fluidly connected to recover a fifth product stream from the reflux zone and exhausted to, for example, the ambient environment via a stack. Alternatively, a combustion system and a TSA separator may be configured where any of the fluid streams admitted and recovered from a TSA separator may flow in direction co-current or counter-current in relation to the direction of the feed stream admitted and recovered from the TSA separator. In one embodiment, at least one particulate collector, for example, mechanical collector or cyclone, fabric filter or baghouse, wet scrubber and diesel particulate filter may be employed to reduce levels of particulates from a combustion gas stream as an alternative to an electrostatic precipitator. In one aspect, primary oxidant source 20, secondary oxidant source 26 and conditioning source 140, may be one or more oxidant sources. An oxidant stream employed as a reactant for combustion in a combustor may comprise, but are not limited to, air supplemented with oxygen or enriched in oxygen above ambient levels, substantially oxygen, air depleted in oxygen, a gas stream which contains less oxygen than ambient air, and recycled combustion gas. In another aspect, a combustor of a combustion system may comprise at least one of: a turbine fuel combustor such as a gas turbine combustor, a combined cycle gas turbine combustor, light hydrocarbon combustor, liquid-fuel (such as oil/kerosene/diesel/gasoline/jet fuel and other liquid fuel fired) combustor, coal-fired combustor (including solid, pulverized, gasified or other forms of coal-fueled combustors such as coal-fired power generation plants), biomass solid and/or liquid fuel combustor, steam generator/boiler combustor, and process heater combustor (such as may be used in refinery and/or industrial processes to heat process fluids and/or gases), for example any combustor, including, for example, an internal combustion or reciprocating engine, turbine, or furnace, for combusting a carbonaceous fuel, such as a fossil-fuel. A combustion system may incorporate a combustor which is fluidly connected to recover an oxidant stream from an oxidant source and a fuel stream from a fuel source, to mix and combust the oxidant stream with the fuel stream forming a combustion gas stream and the combustor may be fluidly connected to admit the combustion gas stream into a particulate collector. The direct contact cooler may be any suitable heat transfer or heat exchange device employed to reduce the temperature of a treated combustion gas stream employed as a feed stream for a TSA separator. The oxidant preheater may comprise any suitable preheater, for example, a rotary heat exchanger.

In one embodiment, a process of operating a combustion system comprising: a fuel source; an oxidant source; a combustor; a feedwater source; a heat exchange device; optionally at least one exhaust after treatment device; a steam turbine; an auxiliary feed water source, an auxiliary heat exchanger; an optional very low pressure steam turbine (herein referred as "VLP turbine"); an adsorptive gas separator, and a condenser is provided. A fuel stream may be recovered from a fuel source and admitted into the combustor, for example, a boiler or a gas turbine, or an internal combustion engine. An oxidant stream may be recovered from an oxidant source and admitted into the combustor where the fuel stream and oxidant stream may be mixed and combusted to produce a combustion gas stream. A water and/or condensate stream may be recovered from a feedwater source and admitted into a cold side of a heat exchange device, for example, a gas-to-liquid heat exchanger, an integrated heat exchanger incorporated with a boiler, a heat recovery steam generator. The combustor may be fluidly connected to admit the combustion gas stream into a hot side of the heat exchange device, supplying heat to convert the water and/or condensate stream in the cold side of the heat exchange device, into a high pressure steam stream which may then be admitted into a steam turbine. At least a portion of the combustion gas stream may be recovered from at least one of the combustor and/or hot side of a heat exchange device and admitted into a TSA separator, for example, a first zone of a TSA separator, for separating of at least a first component, for example, carbon dioxide, sulfur oxides, nitrogen and heavy metals, from a multi-component fluid mixture as a feed stream, for example, the combustion gas stream. The high pressure steam stream may be directed to, for example, a high pressure turbine, an intermediate pressure turbine and a low pressure turbine. A portion of the high pressure steam stream may be recovered from the steam turbine as a low pressure steam stream preferably at a low pressure optionally above about an ambient pressure (for example, at about 100 kPa absolute when the steam turbine is at an elevation of about sea level). In one such exemplary embodiment where the ambient pressure may comprise about 100 kPa, the low pressure steam stream may comprise a pressure of, for example, less than about 600 kPa absolute and optionally greater than about 100 kPa absolute, or specifically, less than about 300 kPa absolute and optionally greater than about 100 kPa absolute, or more specifically, less than about 200 kPa absolute and optionally greater than about 100 kPa absolute, or most specifically, less than about 150 kPa absolute and optionally greater than about 100 kPa absolute, from the steam turbine at a location, for example, downstream to the intermediate pressure turbine and upstream to the low pressure turbine, or downstream to the low pressure turbine. The low pressure steam stream recovered from the steam turbine may be admitted into: a hot side of an auxiliary heat exchanger as a source of heat for converting a water and/or condensate stream in a cold side of the auxiliary heat exchanger into a very low pressure steam stream, for example, less than about 300 kPa absolute, or specifically less than about 200 kPa absolute or more specifically less than about 150 kPa absolute, or a VLP turbine to power at least one mechanically coupled device, for example, an auxiliary electric generator, pump or compressor, prior to recovering a very low pressure steam stream from the VLP turbine. A water and/or condensate stream may be recovered from an auxiliary feedwater source and admitted into a cold side of the auxiliary heat exchanger. producing a very low pressure steam stream The very low pressure steam stream may be recovered from the cold side of the auxiliary heat exchanger and at least a portion of the very low pressure steam stream may optionally be admitted into and employed to power an optional VLP turbine and at least one mechanically coupled device, for example, an auxiliary electric generator, pump or compressor, prior to recovering the very low pressure steam stream from the auxiliary heat exchanger or VLP turbine. At least a portion of the very low pressure steam stream may be recovered from the cold side of the auxiliary heat exchanger and admitted into a TSA separator as a regeneration stream, for example, a first regeneration stream, to regenerate at least a portion of at least one adsorbent material in a TSA separator, prior to forming a portion of a product stream, for example, a second product stream, of the TSA separator, which may be recovered from the TSA separator. The second product stream may be admitted into a condenser, for example, a condensing heat exchanger, to separate and produce a condensate stream and a purified second product stream. The condensate stream recovered from the condenser may be optionally recycled and admitted into the auxiliary feedwater source. Fluidly separating the cold side of an auxiliary heat exchanger and auxiliary condensate source from the cold side of the heat exchange device may advantageously reduce contaminants introduced into the cold side of the heat exchange device. In one such embodiment, employing a VLP turbine may advantageously recover and employ energy that may otherwise be exhausted or not utilized, and/or employing a very low pressure steam stream as a regeneration stream may advantageously reduce the consumption of a high pressure steam stream, high in exergy which may result in reducing the operating cost of a TSA process and TSA separator. Alternatively, a portion of a low pressure steam stream may be recovered from the steam turbine and admitted into a second zone of the TSA separator as a first regeneration stream during a second step or first regenerating step of an exemplary TSA process.

In one embodiment, a combustion system comprises: a fuel source; and oxidant source; a combustor, for example, a boiler, a gas turbine, or an internal combustion engine, fluidly connected to recover a fuel stream from the fuel source and an oxidant stream from the oxidant source for producing a combustion gas stream; a feedwater source; a heat exchange device, for example, an integrated heat exchanger within a boiler or a heat recovery steam generator, having a cold side fluidly connected to recover a water and/or a condensate stream from the feedwater source and a hot side fluidly connected to recover at least a portion of the combustion gas stream from the combustor for producing a high pressure steam stream; optionally at least one exhaust after treatment device, for example, a particulate collector and/or a flue gas desulfurizer, fluidly connected to recover at least a portion of the combustion gas stream from at least one of the combustor and/or heat exchange device; at least one steam turbine fluidly connected to recover the high pressure steam stream from the cold side heat exchange device for producing at least a low pressure steam stream; an optional very low pressure stream turbine or VPL turbine fluidly connected to recover the low pressure steam stream from the steam turbine for producing a very low pressure steam stream, for example, less than about 300 kPa absolute, or specifically less than about 200 kPa absolute or more specifically less than about 150 kPa absolute; an auxiliary feedwater source; an auxiliary heat exchanger fluidly connected to recover a water and/or condensate stream into a cold side of the auxiliary heat exchanger and fluidly connected to recover and admit at least one of a low pressure steam stream from the steam turbine or a combustion gas stream from the hot side of the heat exchange device into a hot side of the auxiliary heat exchanger, and a temperature swing adsorptive gas separator fluidly connected to recover at least a portion of a combustion gas stream produced from at least one of the combustor, the hot side of the heat exchange device or exhaust after treatment device, as a feed stream into a first zone of the temperature swing adsorptive gas separator, optionally fluidly connected to recover a low pressure steam stream as a first regeneration stream from the steam turbine into a second zone of the temperature swing adsorptive gas separator, and optionally fluidly connected to recover a very low pressure steam stream as a first regeneration stream from the VLP turbine into a second zone of the temperature swing adsorptive gas separator, optionally fluidly connected to recover a very low pressure steam stream as a first regeneration stream from a cold side of an auxiliary heat exchanger into a second zone of the temperature swing adsorptive gas separator. In one such embodiment, a VLP turbine may be fluidly connected to the steam turbine, for example, downstream to an intermediate pressure turbine and upstream to a low pressure turbine, or downstream to a low pressure turbine, to recover the low pressure steam stream at above ambient pressure from a steam turbine, where the low pressure steam stream from the steam turbine may be admitted into the VLP turbine, to power the VLP turbine and a mechanically coupled device, for example, an auxiliary electric generator. Optionally a VLP turbine may recover a plurality of low pressure steam streams from a plurality of fluidly connected steam turbines.

In an alternative embodiment, a combustion system may comprise: a fuel source; and oxidant source; a combustor, for example, a boiler, a gas turbine, or an internal combustion engine, fluidly connected to recover a fuel stream from the fuel source and an oxidant stream from the oxidant source for producing a combustion gas stream; a feedwater source; a heat exchange device, for example, an integrated heat exchanger in a boiler or a heat recovery steam generator fluidly connected to recover at least a portion of the combustion gas stream from the combustor and fluidly connected to the feedwater source to recover a water and/or condensate stream for producing a high pressure steam stream; optionally at least one exhaust after treatment device, for example, a particulate collector and/or a flue gas desulfurizer, fluidly connected to recover at least a portion of the combustion gas stream from at least one of the combustor and/or heat exchange device; at least one steam turbine fluidly connected to recover the high pressure steam stream from the heat exchange device, having an optional back pressure turbine optionally as a low pressure stage, for producing a very low pressure steam stream, for example, less than about 300 kPa absolute, or specifically less than about 200 kPa absolute or more specifically less than about 150 kPa absolute; a condensing steam turbine optionally separate from the steam turbine fluidly connected to recover from the steam turbine at least a portion of the very low pressure steam stream, for generating additional power, for example, powering an auxiliary electric generator, and a TSA separator fluidly connected to recover at least a portion of the combustion gas stream from at least one of the combustor, the heat exchange device and/or exhaust after treatment device and admit the combustion gas stream into, for example, a first zone of the TSA separator, and fluidly connected to recover a portion of the very low pressure steam stream recovered from the steam turbine and admit the very low pressure steam stream into, for example, a second zone of the TSA separator. At least a portion of the very low pressure steam stream may be admitted into and let down over the condensing steam turbine, to power at least one mechanically coupled device, for example, an auxiliary electric generator, generating additional electrical power and/or reducing energy loss while a portion of the very low pressure steam stream may be employed and admitted into the TSA separator as a regeneration stream. Alternatively, a portion of a low pressure steam stream may be recovered from the steam turbine and admitted into a second zone of the TSA separator as a first regeneration stream during a second step or first regenerating step of an exemplary TSA process.

In another alternative embodiment, a combustion system may comprise: a fuel source; and oxidant source; a combustor, for example, a boiler, a gas turbine, or an internal combustion engine, fluidly connected to recover a fuel stream from the fuel source and an oxidant stream from the oxidant source for producing a combustion gas stream; a feedwater source; a heat exchange device, for example, an integrated heat exchanger in a boiler or a heat recovery steam generator fluidly connected to recover at least a portion of the combustion gas stream from the combustor and fluidly connected to the feedwater source to recover a water and/or condensate stream for producing a high pressure steam stream; optionally at least one exhaust after treatment device, for example, a particulate collector and/or a flue gas desulfurizer, fluidly connected to recover at least a portion of the combustion gas stream from at least one of the combustor and/or heat exchange device; a steam turbine having, for example, a high pressure turbine, an intermediate pressure turbine and a low pressure turbine fluidly connected to recover the high pressure steam stream from the heat exchange device for producing at least a low pressure steam stream; an auxiliary heat exchanger fluidly connected to recover at least a portion of the low pressure steam stream from the steam turbine, for example, downstream to the intermediate pressure turbine of the steam turbine, upstream to the low pressure turbine of the steam turbine, or downstream to the low pressure turbine of the steam turbine and admit the low pressure steam stream into a hot side of the auxiliary heat exchanger and fluidly connected to recover a water and/or condensate stream from an auxiliary feedwater source and admit the water and/or condensate stream into a cold side of the auxiliary heat exchanger for producing a very low pressure steam stream, for example, less than about 300 kPa absolute, or specifically less than about 200 kPa absolute or more specifically less than about 150 kPa absolute; a TSA separator fluidly connected to recover at least a portion of the combustion gas stream from at least one of the combustor, the heat exchange device and/or exhaust after treatment device and admit at least a portion of the combustion gas stream into, for example, a first zone of the TSA separator and fluidly connected to recover the very low pressure steam stream from the cold side of the auxiliary heat exchanger and admit the very low pressure steam stream into a second zone of the TSA separator, and a condenser, for example a condensing heat exchanger, fluidly connected to recover a second product stream from the second zone of the TSA separator and optionally fluidly connected to recover a condensate stream from the condenser and admit the condensate stream into the auxiliary feedwater source. The auxiliary feedwater source may optionally be fluidly connected to recover at least one condensate stream from a direct contact cooler, a condenser, and/or a compressor. Alternatively, a portion of a low pressure steam stream may be recovered from the steam turbine and admitted into a second zone of the TSA separator as a first regeneration stream during a second step or first regenerating step of an exemplary TSA process.

In another alternative embodiment, a combustion system may comprise: a fuel source; and oxidant source; a combustor, for example, a boiler, a gas turbine, or an internal combustion engine, fluidly connected to recover a fuel stream from the fuel source and an oxidant stream from the oxidant source for producing a combustion gas stream; a feedwater source; a heat exchange device, for example, an integrated heat exchanger in a boiler or a heat recovery steam generator, fluidly connected to recover at least a portion of the combustion gas stream as a heat source from the combustor and fluidly connected to the feedwater source to recover a water and/or condensate stream for producing a high pressure steam stream; optionally at least one exhaust after treatment device, for example, a particulate collector and/or a flue gas desulfurizer, fluidly connected to recover at least a portion of the combustion gas stream from at least one of the combustor and/or heat exchange device; an auxiliary feedwater source; an auxiliary heat exchanger optionally integrated with the heat exchange device where a hot side of the auxiliary heat exchanger may be optionally fluidly connected to recover at least a portion of the combustion gas stream from at least one of the combustor, exhaust after treatment device, or heat exchange device and fluidly connected to recover and admit a water and/or condensate stream from the auxiliary feedwater source and admit the water and/or condensate stream into a cold side of the auxiliary heat exchanger for producing a very low pressure steam stream, for example, less than about 300 kPa absolute, or specifically less than about 200 kPa absolute or more specifically less than about 150 kPa absolute; optionally a very low pressure steam turbine or VLP turbine fluidly connected to optionally recover at least a portion of the very low pressure steam stream from the auxiliary heat exchanger; a TSA separator fluidly connected to recover at least a portion of the combustion gas stream from at least one of the combustor, the heat exchange device and/or exhaust after treatment device, for example, a first zone of the TSA separator and fluidly connected to recover at least a portion of the very low pressure steam stream from the cold side of the auxiliary heat exchanger and admit the very low pressure steam stream as a regeneration stream into a second zone of the TSA separator, and a condenser, for example a condensing heat exchanger, fluidly connected to recover a second product stream from the second zone of the TSA separator and optionally fluidly connected to recover a condensate stream from the condenser and admit the condensate stream into the auxiliary feedwater source. The auxiliary feedwater source may optionally be fluidly connected to recover at least one condensate stream to supply and transfer heat to the heat exchanger which may heat a condensate stream, for example, a condensate stream recovered from a condenser and a second product stream of a TSA separator, a condensate stream from a direct contact cooler, a condenser, and/or a compressor. The VLP turbine may power a mechanically connected device, for example, an auxiliary electric generator, to produce additional power. Alternatively, a portion of a low pressure steam stream may be recovered from the steam turbine and admitted into a second zone of the TSA separator as a first regeneration stream during a second step or first regenerating step of an exemplary TSA process.

The exemplary embodiments herein described are not intended to be exhaustive or to limit the scope of the technology to the precise forms disclosed. They are chosen and described to explain the principles of the technology and its application and practical use to allow others skilled in the art to comprehend its teachings.

As will be apparent to those skilled in the art in light of the foregoing disclosure, many alterations and modifications are possible in the practice of this technology without departing from the scope thereof. Accordingly, the scope of the technology is to be construed in accordance with the substance defined by the following claims.

What is claimed is:

1. A combustion system comprising:
   an oxidant preheater fluidly connected to a primary oxidant source and to a secondary oxidant source and operable to provide a preheated primary oxidant stream and a preheated secondary oxidant stream;
   a fuel source;
   a combustor, fluidly connected to recover at least one of said preheated primary oxidant stream and said preheated secondary oxidant stream from said oxidant preheater, and a fuel stream from said fuel source for combustion, to produce a combustion gas stream, and fluidly connected to admit said combustion gas stream into said oxidant preheater;
   a feedwater source;
   an integrated heat exchanger having a hot side fluidly connected to said combustor and a cold side fluidly connected to recover at least one of a water and/or a condensate stream from said feedwater source, to produce a high pressure steam stream from said cold side;
   a particulate collector fluidly connected to recover said combustion gas stream from said oxidant preheater, for forming a first treated combustion gas stream;
   a direct contact cooler fluidly connected to recover a first portion of said first treated combustion gas stream from said particulate collector;
   a temperature swing adsorptive gas separator fluidly connected to recover said first portion of said treated combustion gas stream from said direct contact cooler as a feed stream comprising at least a first component, fluidly connected to recover a steam stream from at least one of a turbine or a boiler as a first regeneration stream, fluidly connected to recover a second portion of said first treated combustion gas stream from said particulate collector as a second regeneration stream, and fluidly connected to release a first product stream into an ambient environment, wherein said temperature swing adsorptive gas separator is operable to separate at least a portion of said first component from said feed stream to produce a second product stream;
   a condenser fluidly connected to recover said second product stream from said temperature swing adsorptive gas separator to form said condensate stream and a purified second product stream;
   an ejector having a low pressure port and a high pressure port, said low pressure port fluidly connected to admit said purified second product stream recovered from said condenser; and
   a compressor for producing a compressed second product stream, fluidly connected to receive said purified second product stream from said ejector and fluidly connected to admit said compressed second product stream into said high pressure port of said ejector.

2. The combustion system of claim 1, further comprising a first steam turbine fluidly connected to recover said high pressure steam stream from said integrated heat exchanger, and a second steam turbine fluidly connected to recover a low pressure steam stream from said first steam turbine and to produce a very low pressure steam stream, where said second steam turbine is fluidly connected to admit said very low pressure steam stream into said temperature swing adsorptive gas separator.

3. The combustion system of claim 1, further comprising said condenser fluidly connected to recover said second product stream from said temperature swing adsorptive gas separator to form said condensate stream, and an auxiliary boiler fluidly connected to recover at least a portion of said condensate stream from said condenser to produce a low pressure steam stream where said auxiliary boiler is fluidly connected to admit said low pressure steam stream into said temperature swing adsorptive gas separator.

4. The combustion system of claim 1, wherein said temperature swing adsorptive gas separator is operable to produce a third product stream and is fluidly connected to recover said third product stream from said temperature swing adsorptive gas separator and admit said third product stream as a portion of said feed stream admitted into said temperature swing adsorptive gas separator.

5. The combustion system of claim 1, further comprising a conditioning source fluidly connected to admit a conditioning stream into said temperature swing adsorptive gas separator for producing a fourth product stream, wherein said temperature swing adsorptive gas separator is fluidly connected to admit said fourth product stream into said oxidant preheater.

6. The combustion system of claim 1, further comprising a flue gas desulfurizer for reducing a level of sulfur oxides in said first treated combustion gas stream, fluidly connected to recover said first portion of said first treated combustion gas stream from said particulate collector and fluidly connected to admit said first portion of said first treated combustion gas stream into said direct contact cooler.

7. The combustion system of claim 1, further comprising a diverter valve fluidly connected to said particulate collector, for directing said first treated combustion gas stream into said first portion of said first treated combustion gas stream and said second portion of said first treated combustion gas stream.

* * * * *